US009009191B2

(12) United States Patent
Reimer

(10) Patent No.: US 9,009,191 B2
(45) Date of Patent: Apr. 14, 2015

(54) SYSTEMS AND METHODS FOR PRESENTING CONTENT RELEVANT TO TEXT

(75) Inventor: Nils Roger Andersson Reimer, Malmö (SE)

(73) Assignee: BlackBerry Limited, Waterloo, Ontario (CA)

(*) Notice: Subject to any disclaimer, the term of this patent is extended or adjusted under 35 U.S.C. 154(b) by 225 days.

(21) Appl. No.: 13/607,282

(22) Filed: Sep. 7, 2012

(65) Prior Publication Data
US 2013/0254232 A1  Sep. 26, 2013

Related U.S. Application Data

(63) Continuation of application No. PCT/IB2012/051407, filed on Mar. 23, 2012.

(51) Int. Cl.
*G06F 17/30* (2006.01)

(52) U.S. Cl.
CPC .... *G06F 17/30038* (2013.01); *G06F 17/30029* (2013.01)

(58) Field of Classification Search
CPC ............................................... G06F 17/30029
USPC ........................................ 707/772; 715/205
See application file for complete search history.

(56) References Cited

U.S. PATENT DOCUMENTS

| 7,155,456 B2 | 12/2006 | Abbott, III et al. |
| 7,921,122 B2 | 4/2011 | Kelley et al. |
| 2003/0154476 A1 | 8/2003 | Abbott, III et al. |
| 2008/0168134 A1 | 7/2008 | Goodman et al. |
| 2009/0058820 A1 | 3/2009 | Hinckley |
| 2009/0235150 A1 | 9/2009 | Berry |
| 2010/0094822 A1* | 4/2010 | Kelapure ...................... 707/705 |
| 2010/0131523 A1 | 5/2010 | Yu et al. |

OTHER PUBLICATIONS

Patent Cooperation Treaty, International Search Report issued in connection with International application No. PCT/IB2012/051407, search completed May 24, 2012, 3 pages.

* cited by examiner

*Primary Examiner* — Huawen Peng
(74) *Attorney, Agent, or Firm* — Fleit Gibbons Gutman Bongini & Bianco P.L.

(57) ABSTRACT

A system and method are provided for presenting relevant content for attaching files, e.g. for an email application or an instant messaging application. In one example, a method includes providing a keyword extraction engine to extract keywords from text, and providing a keyword mapping engine to map the keywords to at least one attribute and at least one attribute value based on a pre-determined mapping scheme. In another example, a method includes receiving, e.g. from a user, at least one keyword, at least one attribute, and least one attribute value to define a mapping scheme.

28 Claims, 23 Drawing Sheets

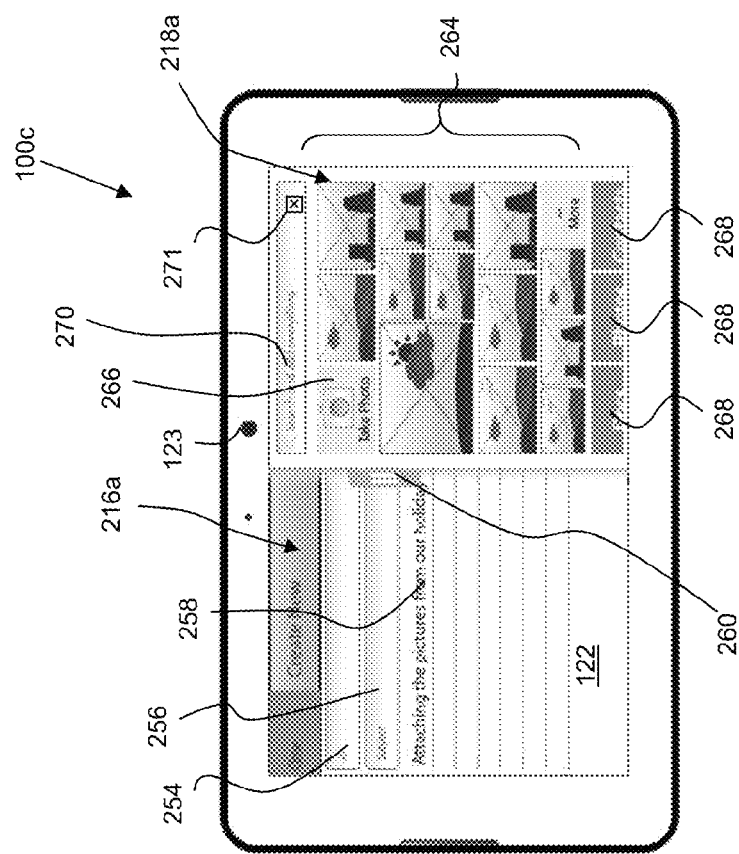
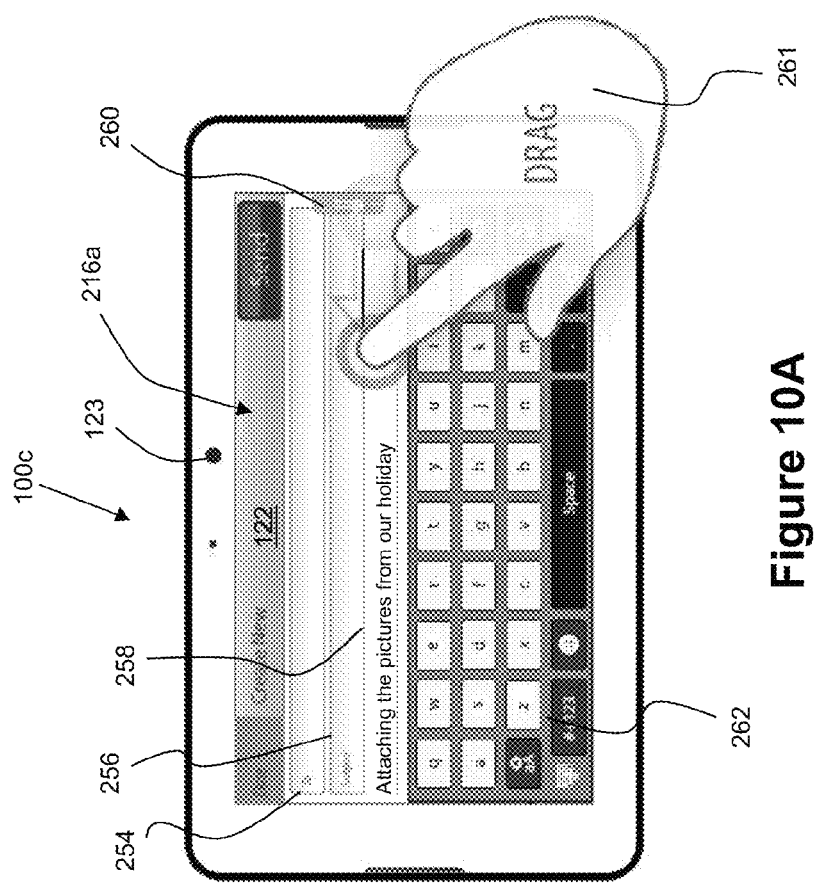
Figure 10B
Figure 10A

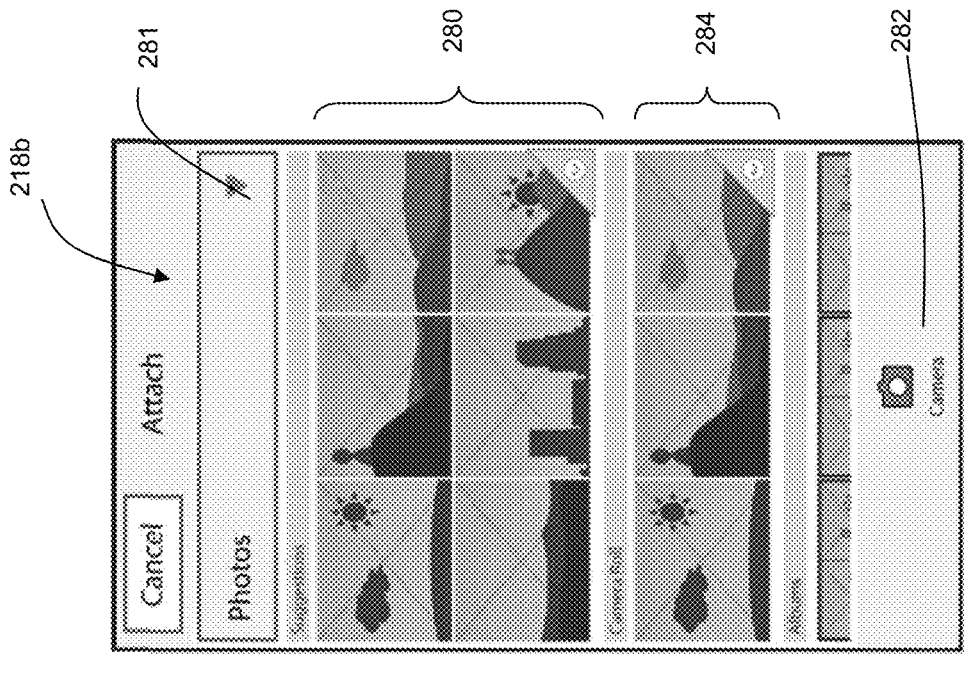
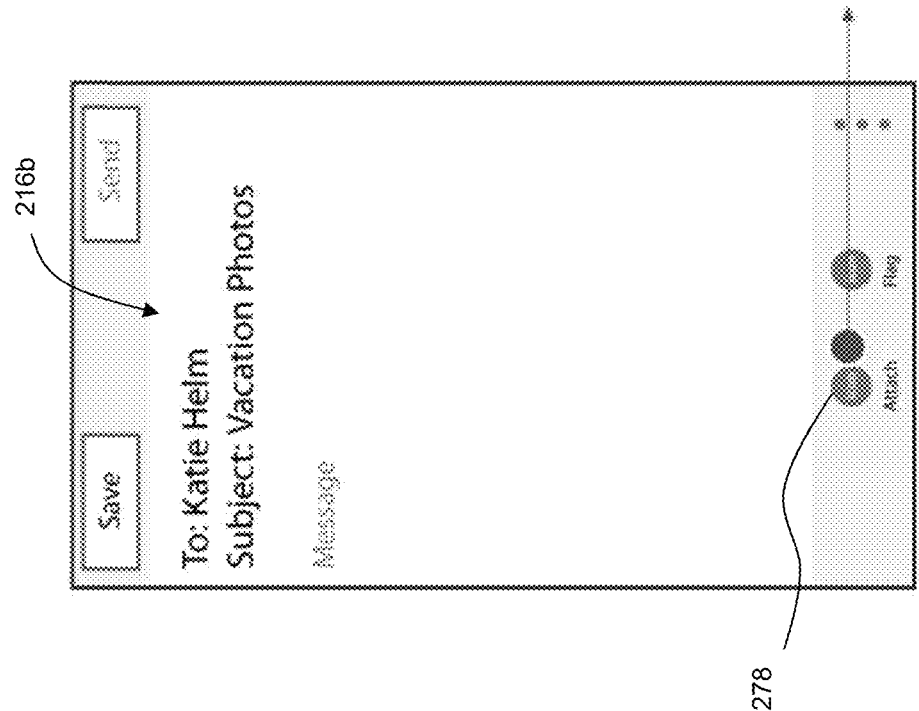
Figure 11A
Figure 11B

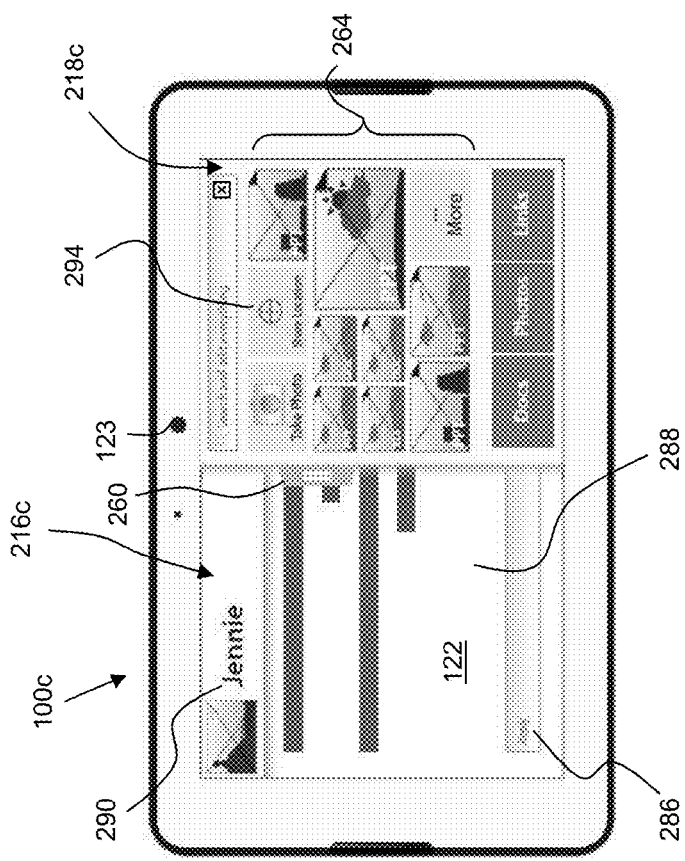
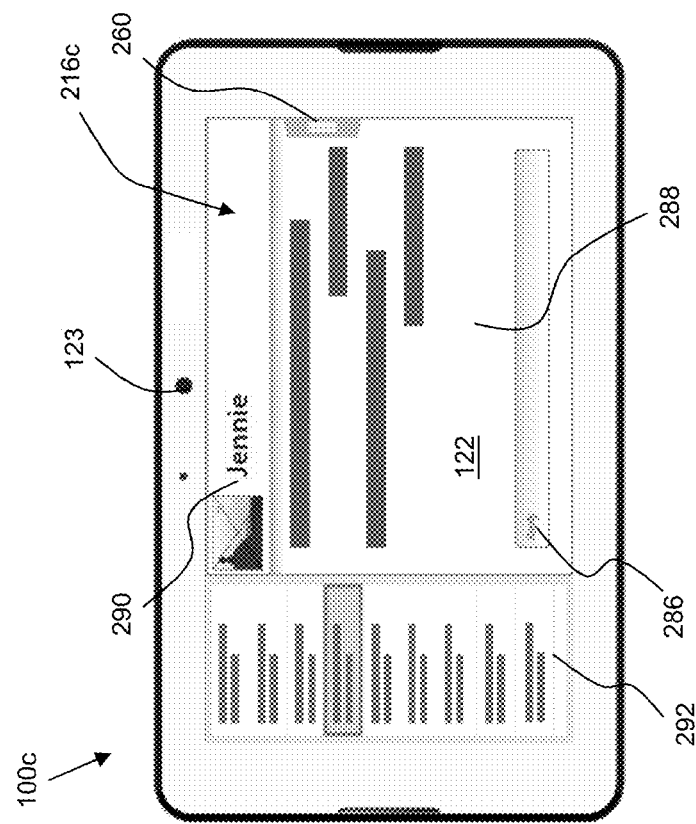
Figure 17B
Figure 17A

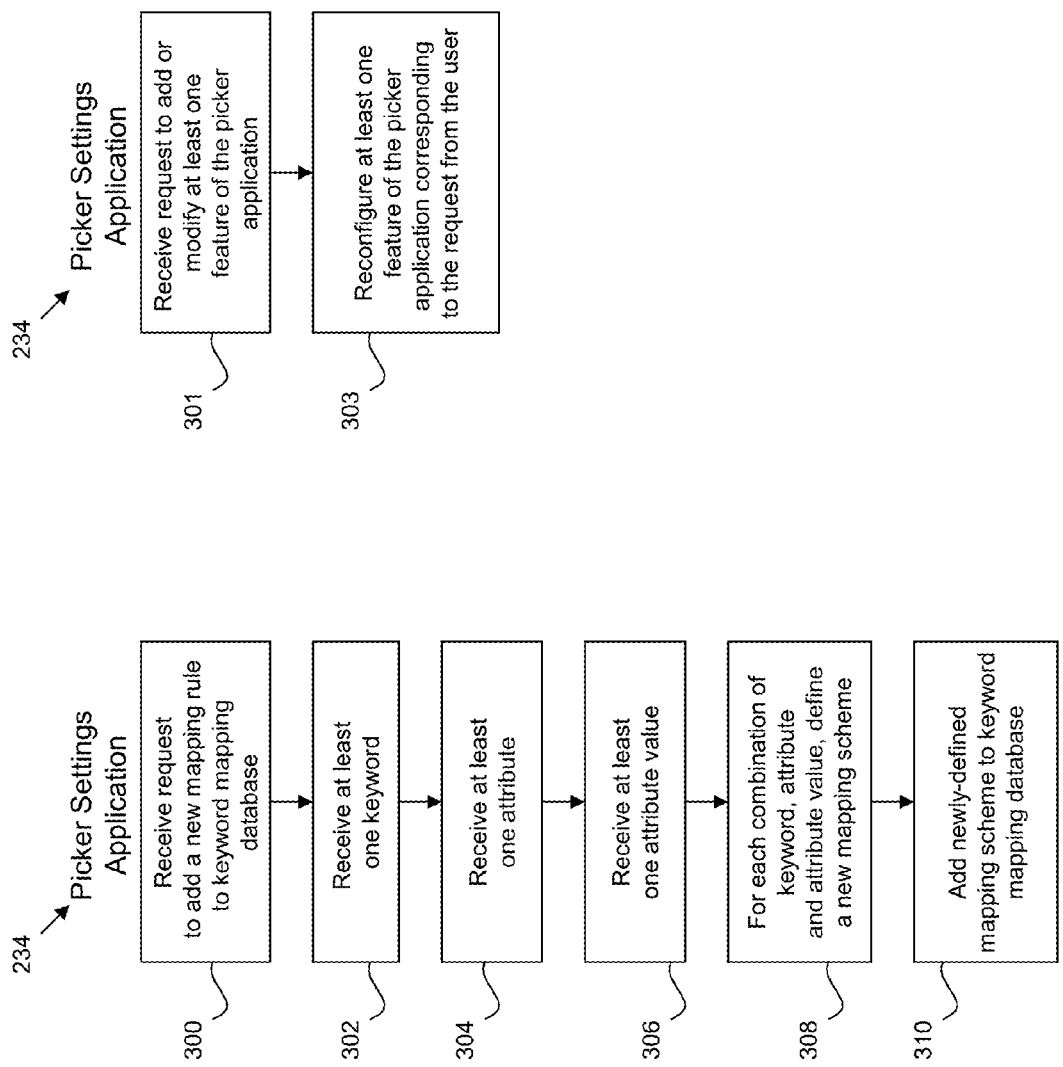

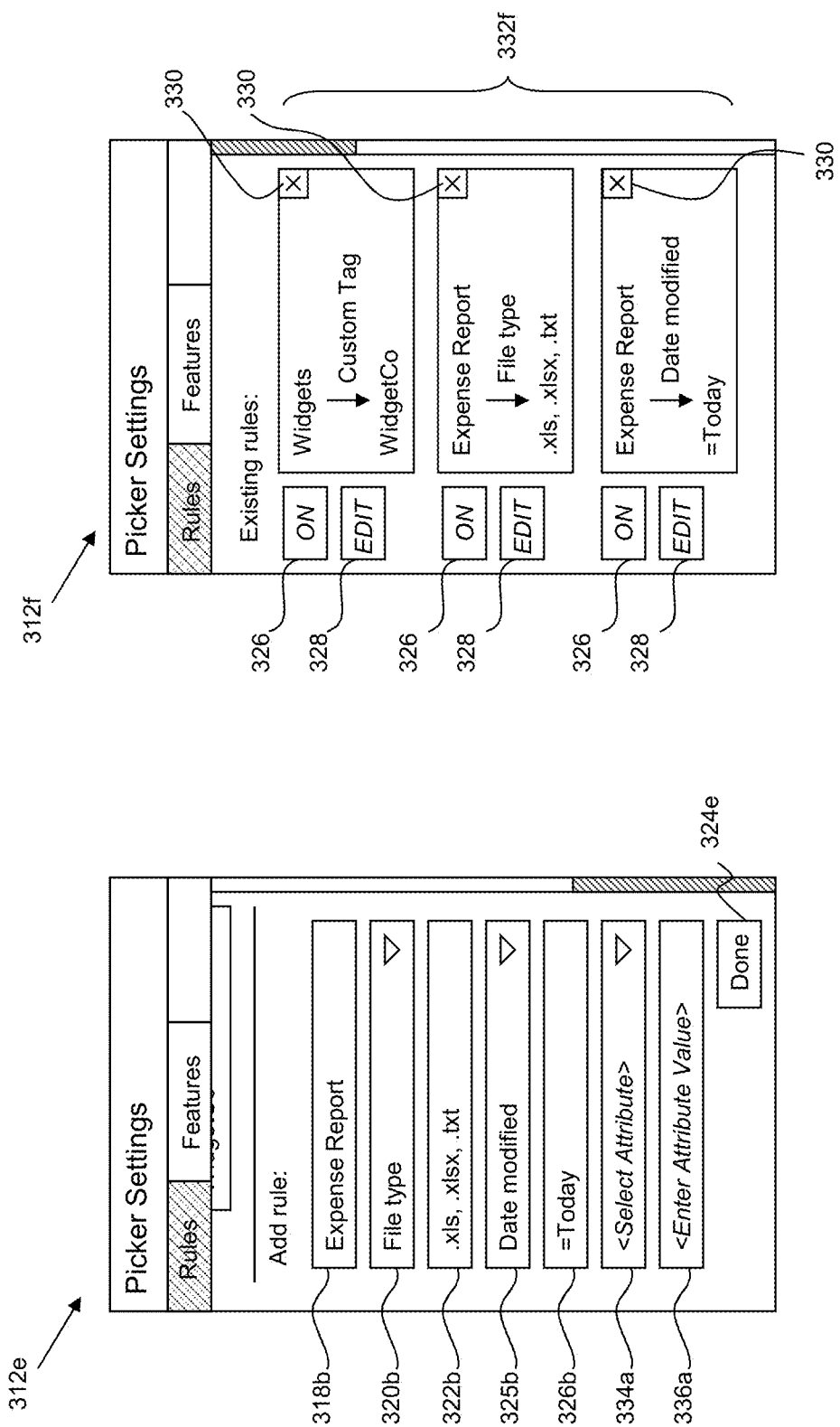

SYSTEMS AND METHODS FOR PRESENTING CONTENT RELEVANT TO TEXT

CROSS-REFERENCE TO RELATED APPLICATIONS

This application is a continuation of PCT Application No. PCT/IB2012/051407 filed on Mar. 23, 2012, the contents of which are hereby incorporated by reference in their entirety.

TECHNICAL FIELD

The following relates generally to presenting content relevant to text.

DESCRIPTION OF THE RELATED ART

A user can send files to another user through text applications, such as email applications and instant messaging applications. Users may find it useful to use this feature to, for example, share documents, photos and videos, with co-workers, family members and friends. Such files can be attached in an email or an instant message.

BRIEF DESCRIPTION OF THE DRAWINGS

Example embodiments will now be described by way of example only with reference to the appended drawings wherein:

FIG. 10A is a screen shot of an example embodiment of a graphical user interface (GUI) for an email application of a mobile device.

FIG. 10B is a screen shot of the GUI of FIG. 10A having a picker GUI in an expanded state.

FIG. 11A is a screen shot of an example GUI for an email application.

FIG. 11B is a screen shot of the GUI of FIG. 11A having a picker GUI in an expanded state.

FIG. 17A is a screen shot of an example embodiment of a GUI for a chat application.

FIG. 17B is a screen shot of the GUI of FIG. 17A having the GUI of the picker application in an expanded state.

FIG. 20 is a flow diagram of an example embodiment of computer executable or processor implemented instructions for a function of the picker settings application.

FIG. 21 is a flow diagram of an example embodiment of computer executable or processor implemented instructions for another function of the picker settings application.

FIG. 22A through FIG. 22G are screen shots of an example embodiment of a picker setting application illustrating the various functionalities thereof.

DETAILED DESCRIPTION

Figure 2:
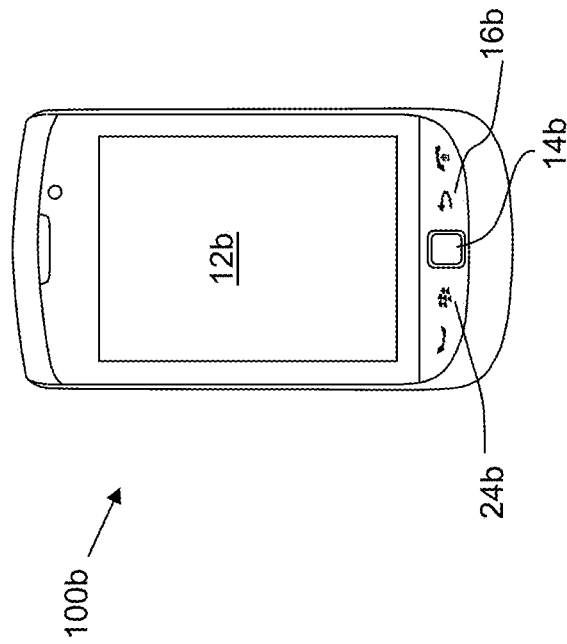
FIG. 2 is a plan view of another example embodiment mobile device.

It will be appreciated that for simplicity and clarity of illustration, where considered appropriate, reference numerals may be repeated among the example figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

Many text applications on computing devices offer the ability to attach files. However, this feature is often limited by user interface constraints such as the screen size and device input capabilities. These constraints often make the task of navigating through file menus to retrieve relevant files cumbersome and time-consuming, which results in a poor user experience.

In an example embodiment, a method performed by a computing device is provided for presenting relevant content. It includes providing a graphical user interface (GUI) for displaying text, the text including at least one string. A picker application is provided and it includes a minimized GUI state and an expanded GUI state. Initially, the picker application is in the minimized GUI state, and then changes to the expanded GUI state. For each string in the text, at least one keyword is extracted. For each keyword, at least one attribute and at least one attribute value are extracted. The computing device then uses each attribute and each attribute value to search for at least one file having the attribute and attribute value. It then displays the results of the search, including the at least one file, in the expanded GUI of the picker application. A user can then use the picker application to conveniently select a file to attach to the text.

In another example embodiment, a method performed by a computing device for presenting relevant content is provided. It includes displaying a settings graphical user interface (GUI). A request is received to add a mapping rule. The computing device receives from the user at least one keyword, at least one attribute, and at least one attribute value. For each combination of the at least one keyword, the at least one attribute, and the least one attribute value, a mapping rule is generated. After detecting the keyword is displayed in a text application, the mapping rule is used to search for at least one file having the attribute value. The file having the attribute is then displayed in a picker application GUI.

It can be appreciated that various mobile devices can be used with the example embodiments described herein. Examples of applicable electronic devices include pagers, tablets, cellular phones, cellular smart-phones, wireless organizers, personal digital assistants, computers, laptops, handheld wireless communication devices, wirelessly enabled notebook computers, camera devices and the like. Such devices will hereinafter be commonly referred to as "mobile devices" for the sake of clarity. It will however be appreciated that the example embodiments described herein are also suitable for other devices, e.g. "non-mobile" devices. The terms mobile devices and computing devices are herein used interchangeably.

In an example embodiment, the mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities).

Figure 1:
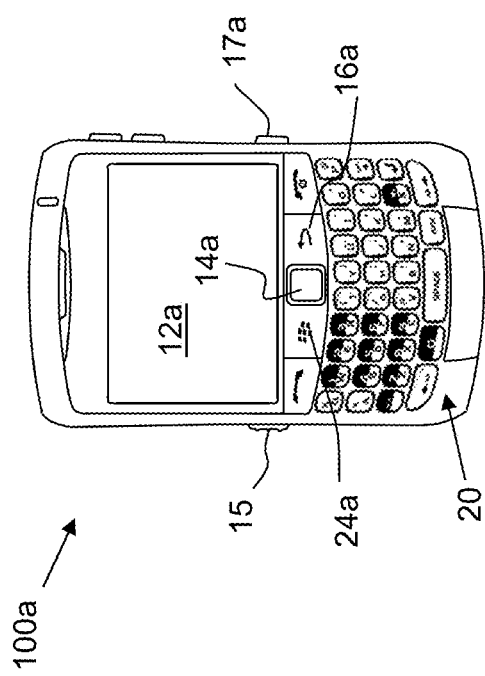
FIG. 1 is a plan view of an example embodiment mobile device.

Referring to FIGS. 1 and 2, an example embodiment of a mobile device 100a is shown in FIG. 1, and another example embodiment of a mobile device 100b is shown in FIG. 2. It will be appreciated that the numeral "100" will hereinafter refer to any mobile device 100, including the example embodiments 100a and 100b, those example embodiments enumerated above or otherwise. It will also be appreciated that a similar numbering convention may be used for other general features common between all Figures such as a display 12, a positioning device 14, a cancel or escape button 16, a camera button 17, and a menu or option button 24.

The mobile device 100a shown in FIG. 1 comprises a display 12a and a cursor or view positioning device 14. Shown in this example embodiment is an optical track pad 14a. In another example embodiment, the positioning device 14 is a track ball (not shown). Positioning device 14 may serve as another input member and detects the displacement of a finger that is moving on top of it to provide selection inputs to the main processor 102 (see FIG. 4). It can also be pressed in a direction generally toward housing to provide another selection input to the processor 102. The optical track pad 14a permits multi-directional positioning of the selection cursor 18 (see FIG. 6) such that the selection cursor 18 can be moved in an upward direction, in a downward direction and, if desired and/or permitted, in any diagonal direction. The optical track pad 14a is in this example situated on the front face of a housing for mobile device 100a as shown in FIG. 1 to enable a user to manoeuvre the optical track pad 14a while holding the mobile device 100a in one hand. The optical track pad 14a may serve as another input member (in addition to a directional or positioning member) to provide selection inputs to the processor 102 and can preferably be pressed in a direction towards the housing of the mobile device 100b to provide such a selection input.

The display 12 may include a selection cursor 18 that depicts generally where the next input or selection will be received. The selection cursor 18 may comprise a box, alteration of an icon or any combination of features that enable the user to identify the currently chosen icon or item. The mobile device 100a in FIG. 1 also comprises a programmable convenience button 15 to activate a selected application such as, for example, a calendar or calculator. Further, mobile device 100a includes an escape or cancel button 16a, a camera button 17a, a menu or option button 24a and a keyboard 20. The camera button 17 is able to activate photo-capturing functions when pressed preferably in the direction towards the housing. The menu or option button 24 loads a menu or list of options on display 12a when pressed. In this example, the escape or cancel button 16a, the menu option button 24a, and keyboard 20 are disposed on the front face of the mobile device housing, while the convenience button 15 and camera button 17a are disposed at the side of the housing. This button placement enables a user to operate these buttons while holding the mobile device 100 in one hand. The keyboard 20 is, in this example embodiment, a standard QWERTY keyboard.

Although not shown in the drawings, it can be appreciated that the devices shown in FIGS. 1 and 2 can have front facing cameras, such that when the user is looking at the display, the user's image is captured by the front-facing camera.

The mobile device 100b shown in FIG. 2 comprises a touch sensitive display 12b and the positioning device 14b in this example embodiment is an optical track pad 14b. In another example embodiment, the positioning device 14b is a track ball (not shown). The mobile device 100b also comprises a menu or option button 24b, and a cancel or escape button 16b. In an example embodiment, the mobile device 100b includes a "slide-out" QWERTY keyboard (not shown). In this example embodiment, the keyboard (not shown), positioning device 14b, escape button 16b and menu button 24b are disposed on a front face of a mobile device housing. The keyboard (not shown) slides out from a side of the mobile device 100b to reveal a standard QWERTY keyboard. In another example embodiment, the mobile device 100b does not include a physical keyboard, but can display a virtual keyboard on the display 12b.

It will be appreciated that for the mobile device 100, a wide range of one or more positioning or cursor/view positioning mechanisms such as a touch pad, a positioning wheel, a joystick button, a mouse, a touchscreen, a set of arrow keys, a tablet, an accelerometer (for sensing orientation and/or movements of the mobile device 100 etc.), or other whether presently known or unknown may be employed. Similarly, any variation of keyboard 20, 22 may be used. It will also be appreciated that the mobile devices 100 shown in FIGS. 1 and 2 are for illustrative purposes only and various other mobile devices 100 are equally applicable to the following examples. For example, other mobile devices 100 may include the trackball 14b, escape button 16b and menu or option button 24 similar to that shown in FIG. 2 only with a full or standard keyboard of any type. Other buttons may also be disposed on the mobile device housing such as colour coded "Answer" and "Ignore" buttons to be used in telephonic communications. In another example, the display 12 may itself be touch sensitive thus itself providing an input mechanism in addition to display capabilities.

Figure 3:
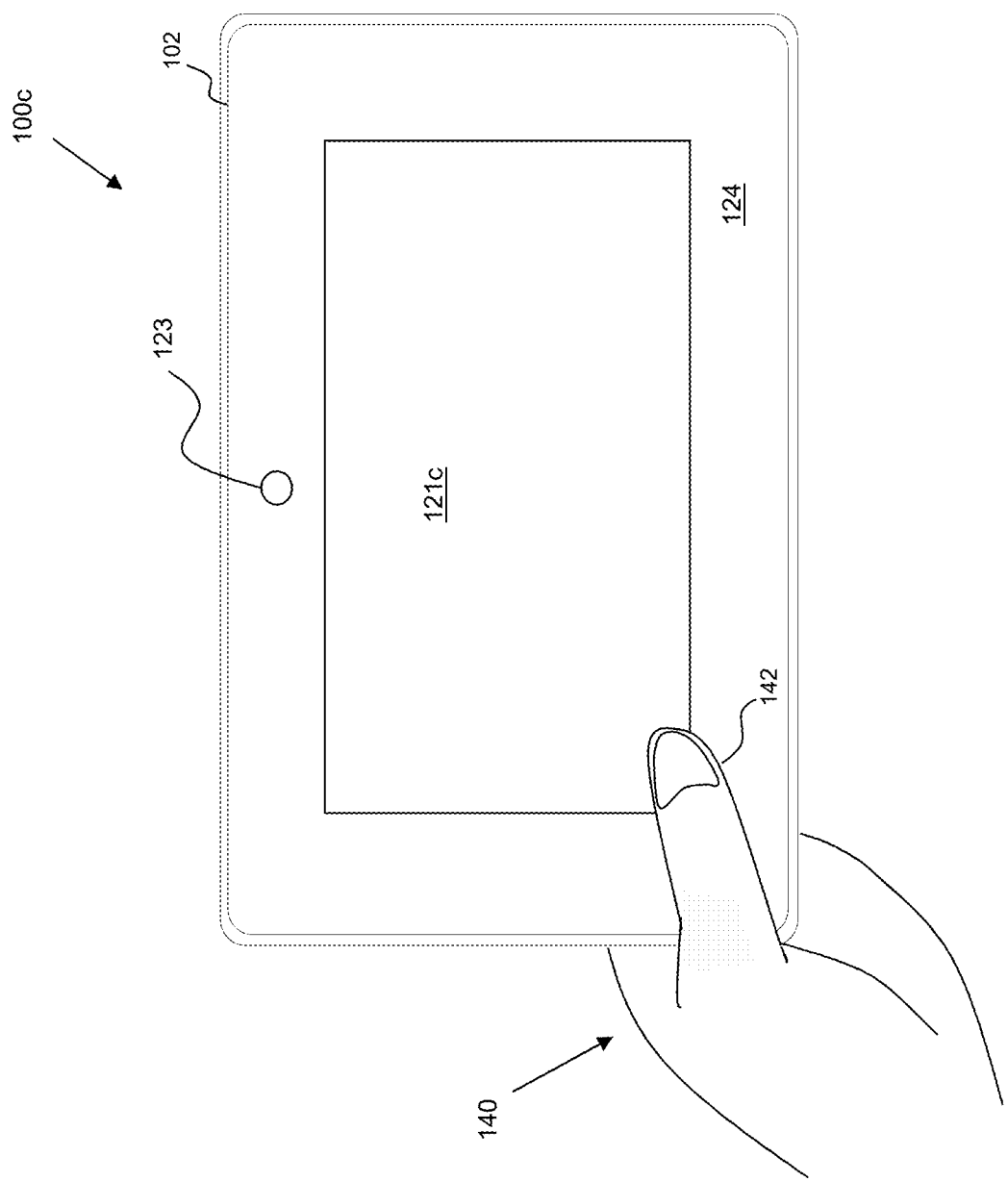
FIG. 3 is a plan view of another example embodiment mobile device.

The mobile device 100c shown in FIG. 3 includes a touch-sensitive display 102 and a front-facing camera 123. The touch-sensitive display 102 includes a touch-sensitive nondisplay area 124 surrounding a touch-sensitive display area 121c, both of which may be capable of receiving inputs in the form of touching. The front-facing camera 123 looks towards the user to capture images or videos of the user or scenes behind the user. Although not shown in FIG. 3, it can be appreciated that the mobile device 100c can include at least one physical button, knob, slider, or any other form of switch for receiving an input from a user. It can also be appreciated that the mobile device 100c includes other software components 139 (see FIG. 4) to enable a virtual keyboard application 262 (see FIG. 10A).

To aid the reader in understanding the structure of the mobile device 100, reference will now be made to FIG. 4.

Figure 4:
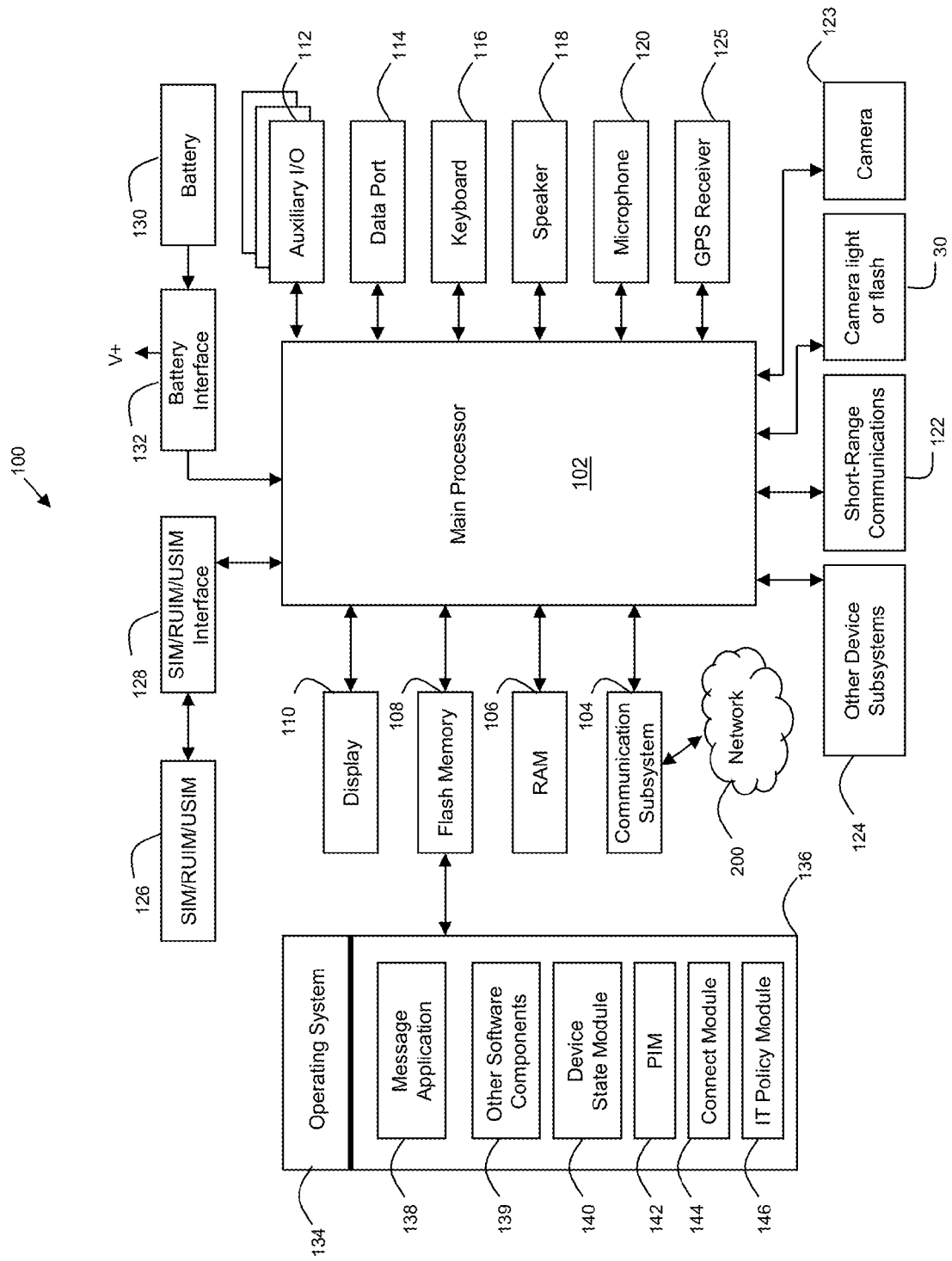
FIG. 4 is a block diagram of an example embodiment of a mobile device.

Referring to FIG. 4, shown therein is a block diagram of an example embodiment of a mobile device 100. The mobile device 100 comprises a number of components such as a main processor 102 that controls the overall operation of the mobile device 100. Communication functions, including data and voice communications, are performed through a communication subsystem 104. The communication subsystem 104 receives messages from and sends messages to a wireless network 200. In this example embodiment of the mobile device 100, the communication subsystem 104 is configured in accordance with the Global System for Mobile Communication (GSM) and General Packet Radio Services (GPRS) standards, which is used worldwide. Other communication configurations that are equally applicable are the 3G and 4G networks such as EDGE, UMTS and HSDPA, LTE, Wi-Max etc. New standards are still being defined, but it is believed that they will have similarities to the network behaviour described herein, and it will also be understood by persons skilled in the art that the example embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, a GPS receiver 125, short-range communications 122, a camera 123, a camera light or flash 30, and other device subsystems 124. The display 110 may be a touch-sensitive display as is the case in the example embodiment shown in FIG. 3.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The mobile device 100 can send and receive communication signals over the wireless network 200 after required network registration or activation procedures have been completed. Network access is associated with a subscriber or user of the mobile device 100. To identify a subscriber, the mobile device 100 may use a subscriber module component or "smart card" 126, such as a Subscriber Identity Module (SIM), a Removable User Identity Module (RUIM) and a Universal Subscriber Identity Module (USIM). In the example shown, a SIM/RUIM/USIM 126 is to be inserted into a SIM/RUIM/USIM interface 128 in order to communicate with a network. Without the component 126, the mobile device 100 is not fully operational for communication with the wireless network 200. Once the SIM/RUIM/USIM 126 is inserted into the SIM/RUIM/USIM interface 128, it is coupled to the main processor 102.

The mobile device 100 is a battery-powered device and includes a battery interface 132 for receiving one or more rechargeable batteries 130. In at least some example embodiments, the battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100.

The mobile device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 100 during its manufacture. Software applications may include a message application 138, a device state module 140, a Personal Information Manager (PIM) 142, a connect module 144 and an IT policy module 146. A message application 138 can be any suitable software program that allows a user of the mobile device 100 to send and receive electronic messages, wherein messages are typically stored in the flash memory 108 of the mobile device 100. A device state module 140 provides persistence, i.e. the device state module 140 ensures that important device data is stored in persistent memory, such as the flash memory 108, so that the data is not lost when the mobile device 100 is turned off or loses power. A PIM 142 includes functionality for organizing and managing data items of interest to the user, such as, but not limited to, e-mail, contacts, calendar events, and voice mails, and may interact with the wireless network 200. A connect module 144 implements the communication protocols that are required for the mobile device 100 to communicate with the wireless infrastructure and any host system, such as an enterprise system, that the mobile device 100 is authorized to interface with. An IT policy module 146 receives IT policy data that encodes the IT policy, and may be responsible for organizing and securing rules such as the "Set Maximum Password Attempts" IT policy.

Other types of software applications or components 139 can also be installed on the mobile device 100. These software applications 139 can be pre-installed applications (i.e. other than message application 138) or third party applications, which are added after the manufacture of the mobile device 100. Examples of third party applications include games, calculators, utilities, picker applications, virtual keyboards, etc.

The additional applications 139 can be loaded onto the mobile device 100 through at least one of the wireless network 200, the auxiliary I/O subsystem 112, the data port 114, the short-range communications subsystem 122, or any other suitable device subsystem 124.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

For voice communications, received signals are output to the speaker 118, and signals for transmission are generated by the microphone 120. Although voice or audio signal output is accomplished primarily through the speaker 118, the display 110 can also be used to provide additional information such as the identity of a calling party, duration of a voice call, or other voice call related information.

It will be appreciated that any module or component exemplified herein that executes instructions or operations may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data, except transitory propagating signals per se. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 100, or accessible or connectable thereto. Any application or module herein described may be implemented using computer readable/executable instructions or operations that may be stored or otherwise held by such computer readable media.

It can be appreciated that the systems and methods described herein are applicable to various types of files. In an example embodiment, a file can have one or more attributes and each of these attributes can have one or more values. Examples of attributes include file name, file type, date created, date modified, storage location, author name, metadata, etc. Metadata may include "tag" information such as location tags, people tags and custom tags. Metadata may be used to further categorize a file. An attribute's value is typically dependent on the attribute. For example, the attribute "file type" has the value ".doc" or ".jpg" or ".mp3". In another example embodiment, the attribute "custom tag" has the attribute value "food photos".

In an example embodiment, a file is stored on memory of the mobile device 100. In another example embodiment, a file can be located on an external server.

Figure 5:
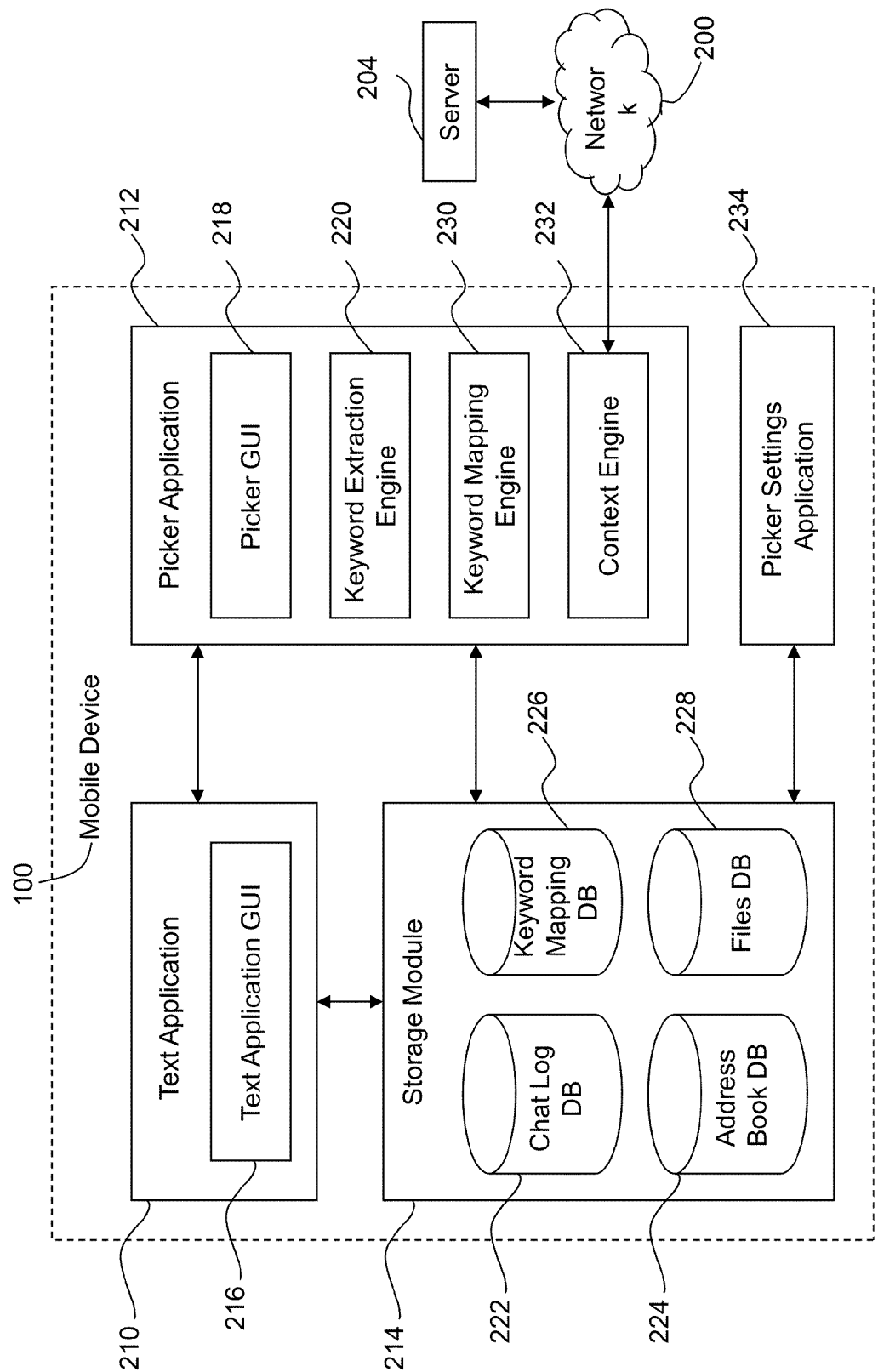
FIG. 5 is a block diagram of an example embodiment of a system for presenting relevant content when attaching files.

Turning to FIG. 5, an example embodiment of a system for presenting relevant content when attaching files is provided. The elements of the system are located in the mobile device 100 and includes a text application 210, a picker application 212, a storage module 214 and a picker settings application 234.

The text application 210 is preferably a messaging application, such as an email application or an instant messaging application. In another example embodiment, the text application 210 can be any suitable software program that allows a user of the mobile device 100 to read or write text. An example includes a word processing application. The terms "text", "message" and "string" are herein used interchangeably.

The text may be directly or indirectly provided by the user via any of the I/O capabilities of the mobile device 100 such as the keyboard 116, the touch sensitive display 121, the microphone 120, etc. It can be appreciated that certain forms of input, such as input from the microphone 120, can be used to input text when provided with appropriate signal processing means, e.g. a voice to text converter (not shown).

A text application GUI 216 of the text application 210 serves as a front end for receiving text input or displaying text, or both. For an email application, the text may be inputted into several fields of the text application GUI 216 such as a "subject" field, an addressee field, or a "body" field. For an instant messaging application, the text may be inputted into a reply field.

In an example embodiment, the picker application 212 of FIG. 5 is a stand-alone software component of the mobile device 100. For example, the picker application 212 is a software component of the operating system 134, e.g. as part of the other software components 139. In another example embodiment, the picker application 212 is a subset of another software component such as the text application 210. In general, the picker application 212 is associated with at least one other application such as the text application 210 such that when the at least one other application is activated, the picker application 212 is also activated. When the at least one other application is closed or otherwise deactivated, the picker application 212 is also closed or deactivated.

The picker application 212 of FIG. 5 is in communication with the text application 210 and the storage module 214, and includes a picker GUI 218, a keyword extraction engine 220, a keyword mapping engine 230 and optionally a context engine 232.

The keyword extraction engine 220 communicates with the text application 210 to convert text into keywords. The keywords are used to identify files, which are to be presented to the user in the picker GUI 218. In an example embodiment, the keyword extraction engine 220 retrieves information from the various databases of the storage module 214 to assist in forming additional keywords, the methods for which will be described later.

The keyword mapping engine 230 receives the keywords extracted by the keyword extraction engine 220 and converts the keywords to attributes and attribute values via a two-step mapping operation. The details of this operation will be described later.

The picker application 212 optionally provides a context engine 232. The context engine 232 provides contextual information to the text of the text application 210. In an example embodiment, the context engine 232 extracts semantic information from the text using functions stored on the mobile device 100. In another example embodiment, the context engine 232 consults an external server 204 to extract semantic information from the text. In either embodiment, the context engine 232 communicates with the keyword extraction engine 220 to provide a modified set of keywords where the modification is appropriate.

The picker GUI 218 serves as a front end for providing, as output, a listing of file suggestions 264 (see FIG. 10B) based on the analysis performed by the various components of the picker application 212 as described above.

The storage module 214 includes a chat log database 222, a keyword mapping database 226, an address book database 224, and a files database 228. The various databases of the storage module 214 reside on the memory 108 of the mobile device 100. It can be appreciated that certain types of information of the various databases, for example, information regarding which elements of the databases have been recently viewed, are stored in the RAM 106 of the mobile device 100, or otherwise stored in any other form of short term storage.

The chat log database 222 stores a history of text that the user of the mobile device 100 has sent and received in the past, for example, in the context of an instant messaging application. In an example embodiment, the text application 210 synchronizes the chat log database 222 every time the user sends or receives a new next from another user. The chat log database 222 stores a record for each chat session that the user has engaged in. The chat log database 222 records the names, or otherwise a user identifier, of participants for each chat session, as well as all text sent and received by the user during that chat session. This text can include system generated or application generated text having information on files that have been sent to and received by the user, e.g. "Transfer of vacation_photo.bmp complete".

The address book database 224 stores contact information, for example, contact information provided to the PIM 142 or an address book application (not shown). In addition to general contact information such as first and last name, mailing address, email address, telephone number, etc., the address book database 224 can also provide other information such as the date on which a contact was added to an address book or customizable group tags (e.g. co-worker, family).

The files database 228 provides a listing of files. The files database 228 also provides a listing of attributes and attribute values associated with each file from the listing of files. The files database also provides the address location of each file from the listing of files.

The keyword mapping database 226 provides a set of mappings, each mapping to map at least one keyword to at least one attribute, and at least one attribute to at least one attribute value. A default set of mappings is defined by the picker application and stored in the keyword mapping database 226. In an example embodiment, the user of the mobile device 100 additionally has the option of defining custom mappings as will be described later.

The picker settings application 234 of FIG. 5 is a software component which allows the user of the mobile device 100 to tailor the functionality of the picker application 212. This aspect of the invention will be described later in detail.

It can be appreciated that the system of FIG. 5 may be reconfigured in various ways. As a non-limiting example, there may be a plurality of text applications 210, each text application 210 being in communication with the picker application 212 and the storage module 214. In another non-limiting example, the storage module 214 and its components may reside on an external server (not shown).

Figure 6:
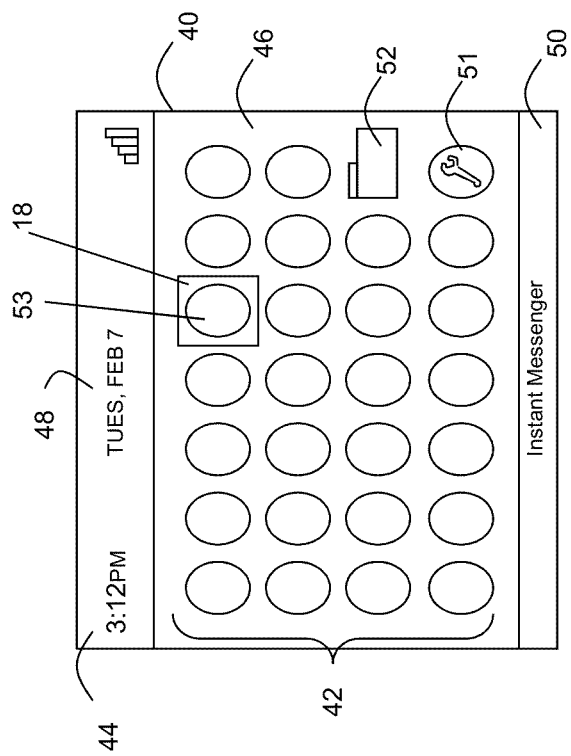
FIG. 6 is a screen shot of a home screen displayed by the mobile device, according to an example embodiment.

Turning now to FIG. 6, the mobile device 100 may display a home screen 40, which can be set as the active screen when the mobile device 100 is powered up and may constitute the main ribbon application. The home screen 40 generally comprises a status region 44 and a theme background 46, which provides a graphical background for the display 12. The theme background 46 displays a series of icons 42 in a pre-defined arrangement on a graphical background. In some themes, the home screen 40 may limit the number of icons 42 shown on the home screen 40 so as to not detract from the theme background 46, particularly where the background 46 is chosen for aesthetic reasons. The theme background 46 shown in FIG. 6 provides a grid of icons. It will be appreciated that preferably several themes are available for the user to select and that any applicable arrangement may be used. An example icon may be a picker settings application icon 51 used to indicate a picker settings application 234. One or more of the series of icons 42 is typically a folder 52 that itself is capable of organizing any number of applications therein.

The status region 44 in this example embodiment comprises a date/time display 48. The theme background 46, in addition to a graphical background and the series of icons 42, also comprises a status bar 50. The status bar 50 provides information to the user based on the location of the selection cursor 18, e.g. by displaying a name for the icon 53 that is currently highlighted.

An application, such as message application 138 may be initiated (opened or viewed) from display 12 by highlighting a corresponding icon 53 using the positioning device 14 and providing a suitable user input to the mobile device 100. For example, message application 138 may be initiated by moving the positioning device 14 such that the icon 53 is highlighted by the selection box 18 as shown in FIG. 6, and providing a selection input, e.g. by pressing the trackball 14*b*.

Figure 7:
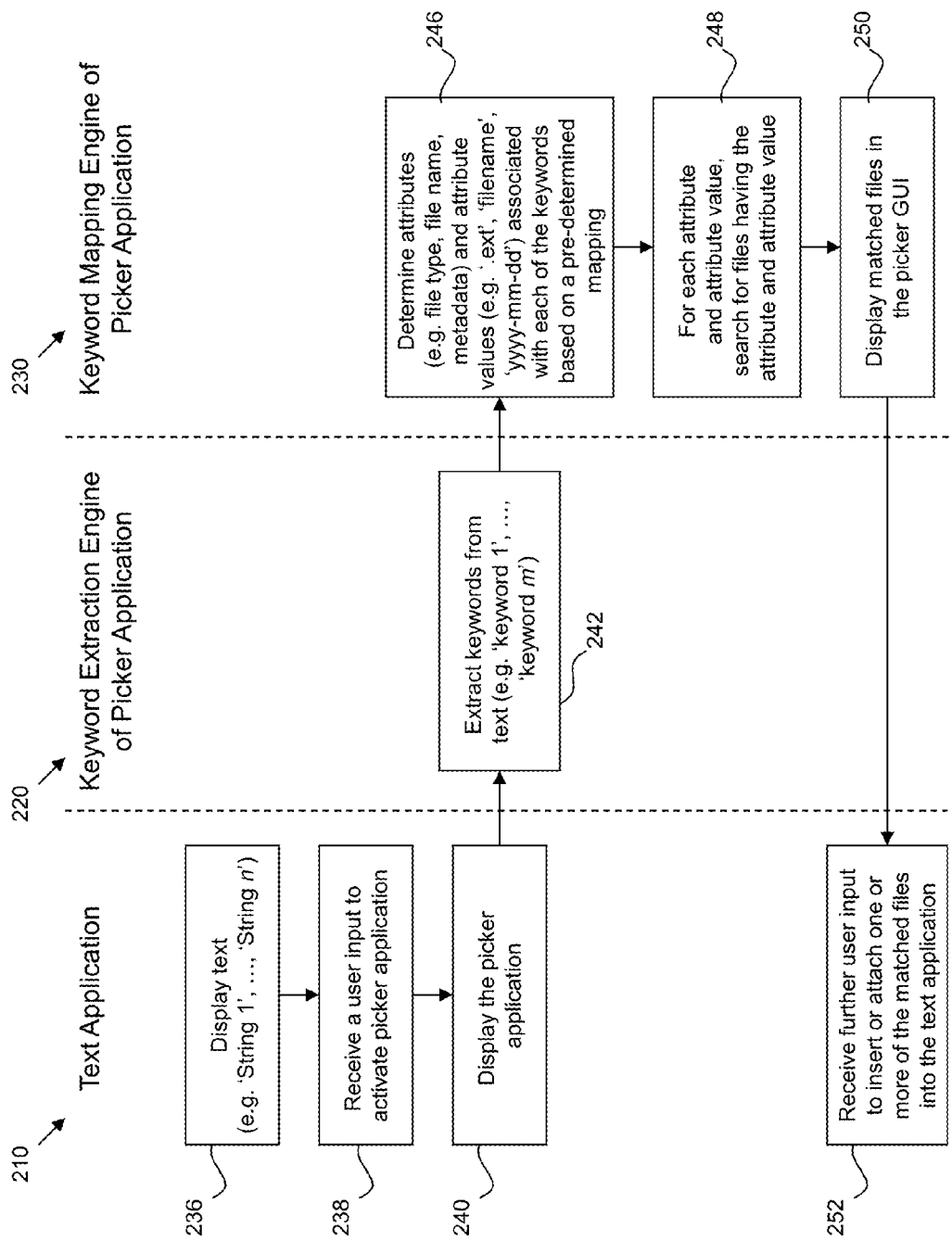
FIG. 7 is a flow diagram of an example embodiment of computer executable or processor implemented instructions for presenting relevant content when attaching files.

Referring now to FIG. 7, a flow diagram of an example embodiment of a method for presenting relevant content when attaching files is shown. A general overview of each operation is described below. Further details relating to the GUI and mapping aspects of each operation are provided later in the description.

At block 236, the text application 210 displays text on the mobile device 100. For example, if the text application 210 is an email application, the user may enter text in the "subject" field and the addressee field of the email, the user may also enter text in the main body of the email. If the text application 210 is a chat or messaging application, the user may enter text in reply to a text that was sent by another user of another mobile device, or the user may enter text to begin a chat session with another user of another mobile device. In another example embodiment, text is not necessarily inputted and text is displayed by the text application 210.

At block 238, the text application 210 receives a user input to activate the picker application 212. At block 240, the picker application 212 is displayed. The details of blocks 238 and 240 will be described later.

At block 242, the keyword extraction engine 220 extracts keywords from the text displayed by the text application 210. In the method of FIG. 7, the keyword extraction engine 220 parses the text into keywords without consulting the context engine 232 or any of the databases of the storage module 214. The keyword extraction engine 220 may perform parsing functions to parse text into one or more keywords. For example, commas and spaces can be used as delimiters. The keyword extraction engine 220 may perform a basic filtering functions to omit, for example, conjunctions (e.g. "and", "or", "but") and pronouns (e.g. "he", "you", "each") from the text. The keyword extraction engine 220 may also pre-define a listing of commonly used words (e.g. "hi", "no", "please") to be excluded as keywords.

At block 246, the keyword mapping engine 230 determines attributes and attribute values associated with each of the keywords based on a pre-determined mapping. The pre-determined mapping is provided by the keyword mapping database 226. In an example embodiment, the mapping occurs in two steps. The first mapping uses a keyword to determine an associated attribute. The second mapping uses the associated attribute or keyword, or both, to determine an attribute value.

The two mapping operations are not mutually independent operations. For example, the keyword "photo" may be mapped to the attribute "file type". Then, the attribute "file type" may be mapped to the attribute values ".jpg", ".png", ".bmp", and ".gif" based on the keyword "photo." If the keyword was "music" instead, this keyword may also have been mapped to the attribute "file type", but the mapped attribute values are now ".mp3", ".wav" and ".aac". Hence, the mapping from attribute to attribute value depends on the mapping from keyword to attribute.

In an example embodiment, a mapping is generally not a one-to-one mapping, but a many-to-many mapping. For instance, one keyword may yield a plurality of attributes, and similarly one attribute yields multiple attribute values. Conversely, multiple keywords yield one attribute, and multiple attributes yield one attribute value.

A set of mappings are pre-programmed into the keyword mapping engine 230. In another example embodiment, the user of the mobile device 100 provides a set of user-defined mappings via the picker settings application 234, as will be described later in detail.

For the sake of clarity, mappings and mapping operations referred to from herein may refer to an "effective mapping" from attribute to attribute value with the understanding that such "effective mapping" is contingent on the initial mapping from keyword to attribute.

At block 248, for each attribute and attribute value determined by the keyword mapping engine 230 based on the mapping operation described above, the keyword mapping engine 230 then searches for files having the attribute and attribute value. To determine a matched file, the keyword mapping engine 230 compares the attributes and attribute values determined by the mapping operation with those associated files stored in the files database 228. For example, if a mapping operation revealed the mapping of "file type" to ".jpg", the keyword mapping engine 230 will search the files database 228 for all files having the attribute "file type" and attribute value ".jpg".

At block 250, the keyword mapping engine 230 displays the matched files in the picker GUI 218. The keyword mapping engine 230 may assign a relevancy rating to each matched file. A file may be considered more relevant based on the number of mappings that was associated to the file. For example, a file that is identified against two different criteria is rated to be more relevant than a file that has been identified against one criterion. More relevant files are shown first in the listing of matched files. Other schemes for assigning a relevancy rating are also contemplated.

At block 252, the text application 210 receives further user input to insert or attach at least one of the matched file into the text application.

Figure 8:
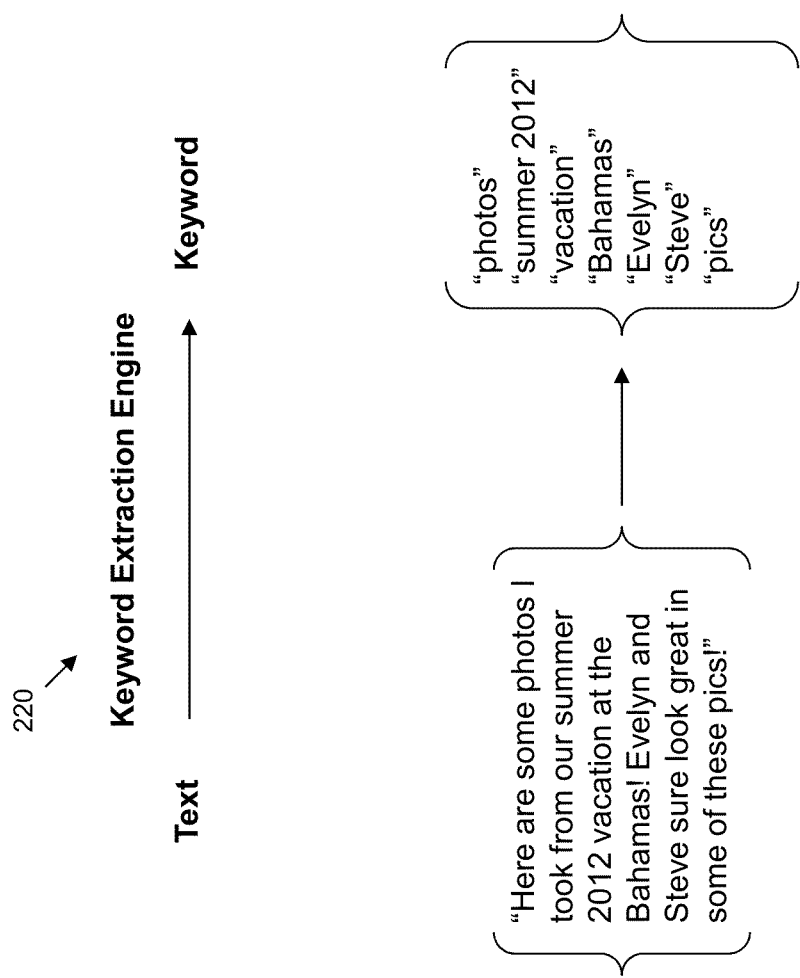
FIG. 8 is an illustration of an example embodiment of keywords extracted from text based on the method of FIG. 7.

Turning now to FIG. 8, an illustration of keywords extracted from text using the keyword extraction engine of FIG. 7 is provided. In this example, the text application 210 has received a text from the user per block 236 ("Here are some photos I took from . . . "). The text is in the context of an email. The keyword extraction engine 220 converts the text into keywords (block 242). The keyword extraction engine 220 has removed pronouns ("I", "our"), conjunctions ("and"), and commonly used words ("Here", "are", "some", etc.) based on a pre-determined listing of commonly used words. The extracted keywords are shown in FIG. 8 as "photos", "summer", "2012", etc.

Figure 9:
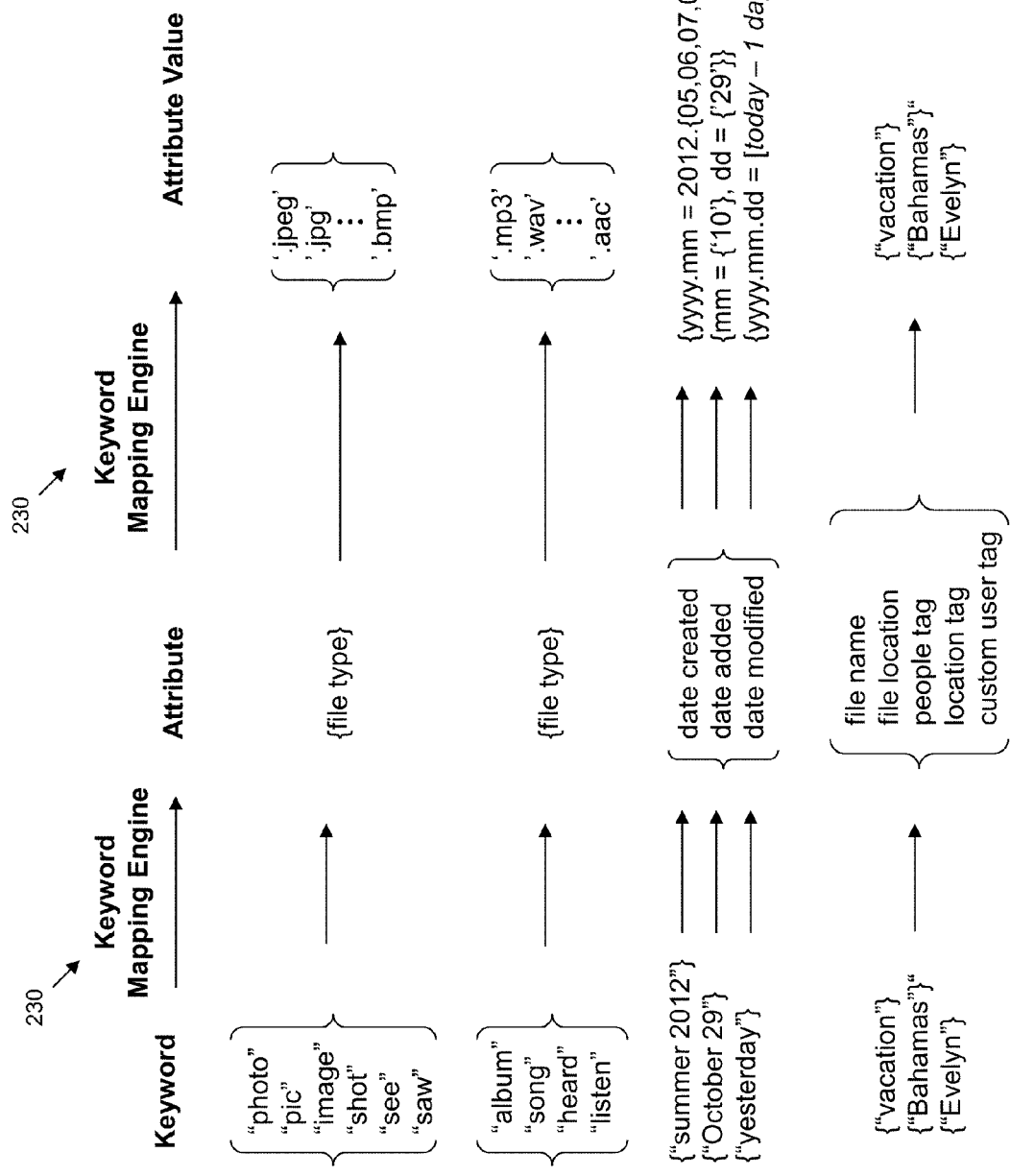
FIG. 9 is an illustration of an example embodiment of a mapping scheme of keywords to attributes and attribute values, based on the method of FIG. 7.

Turning now to FIG. 9, an illustration of an example embodiment of a mapping scheme of keywords to attributes and attribute values based on the method of FIG. 7 is shown. The two-step mapping scheme is provided by the keyword mapping database 226. The keyword mapping engine 230 uses this pre-determined mapping scheme to determine attributes and attribute values associated with each of the keywords.

In FIG. 9, and in later similar Figures, each set of keywords, attributes, and attribute values, as indicated by curly brackets, indicate a common mapping relation. For example, the set keywords "photo", . . . "shot" map to the single attribute "file type", and also map to the attribute values ".jpeg", . . . , ".bmp". In other words, if the keywords "photo", "shot", "pic", etc. are extracted, then file types having the file extension ".jpg", ".tiff", ".bmp", etc. will be searched. In another example, the keyword "summer 2012" maps to the set of attributes "date created", . . . , "date modified", and also maps to the set of attribute values representing the dates in the year of 2012 which belong to the summer months (e.g. May-August). In another example, the keyword "Bahamas" map to the set of attributes "file name", . . . , "custom user tag", where the attribute value is also the keyword "Bahamas". In other words, if a file has "Bahamas" in its file name, file location, people tag, location tag, or custom user tag, then that file is returned as a positive result. Similarly, if a file has "Evelyn" in its file name, file location, people tag, location tag, or custom user tag, then that file is returned as a positive result.

In an example embodiment, the keyword extraction engine 220 or the keyword mapping engine 230 may, under certain pre-determined scenarios, use functions to concatenate strings or pull systems information from the mobile device 100. For example, the keyword mapping 230 can map the keyword "yesterday" to a function for retrieving the current date from the operating system of the mobile device 100, followed by a function for assigning, to the attribute value, the value for the current date minus one day. In another example embodiment, the keyword extraction engine 220 can use a function to recognize when a plurality of strings associated with date attributes (e.g. month, day, year) are in close proximity to each other, and concatenate the strings so that a single keyword is assigned to the strings. For example, if the keyword extraction engine 220 recognizes that two strings "summer" and "2012" are adjacent to each other, the keyword extraction engine 220 assigns a single keyword "summer 2012" to the two strings. The keyword mapping engine 230 then maps the keyword "summer 2012" to a range of date attributes from "2012.05.01" to "2012.08.31". In another example, the criterion for concatenation may be that the plurality of strings associated with date attributes are within a certain number of words from each other. In another example, the plurality of strings may not necessarily be associated with date attributes, but with, for example, music metadata (e.g. track name, artist, album, year).

Wherein a particular keyword has not been defined by the keyword mapping database 226, a default mapping operation can be assigned. For the example in FIG. 9, the keywords "vacation", "Bahamas" and "Evelyn" do not have associated keyword mappings as defined in the keyword mapping database 226. Hence the keyword mapping engine 230 will automatically map these keywords to a pre-determined set of attributes (e.g. "file name", "file location", . . . ). It is found that generally associating keywords that do not otherwise have a defined mapping with file metadata (e.g. people tag, location tag, custom user tag) is an effective way of matching otherwise unclassifiable keywords with attributes and attribute values. For this default mapping operation, the keyword is used as the attribute value.

The text application GUI 216 and the picker GUI 218 will now be described.

FIG. 10A is a screen shot of an example embodiment of a text application GUI 216a for a text application 210 of the mobile device 100c shown in FIG. 3. In this example embodiment, the text application 210 is an email application. The text application GUI 216a includes a "to" field 254, a "subject" field 256 and a "body" field 258. A virtual keyboard 262 receives text input from the user via the touch sensitive display 121. The user can touch any of the fields of the text application GUI 216a to designate a target for the text input.

FIG. 10A shows that the user has typed, in the "body" field 258, the text "Attaching the pictures from our holiday". The "to" field 254 and "subject" field 256 are blank.

A picker tab 260 of the picker application 212 is displayed on the right of the touch sensitive display 121. Upon initially activating the text application 210, the picker application 212 is automatically activated, with the picker GUI 218 defaulting to a minimized state as shown in FIG. 10A. The user expands the picker GUI 218a by performing a drag gesture 261 on the picker tab 260 (e.g. block 240). The expanding of the picker GUI 218a also activates the keyword extraction engine 220, causing the keyword extraction engine 220 to begin to extract keywords based on the text in the "to" field 254, "subject" field 256 and "body" field 258 of the text application GUI 216a (block 242).

The persistent presence of the picker tab 260 in text application GUI 216 reminds the user that the option of including file attachments is readily available. In the example embodiment of FIG. 10A, the expanding of the picker GUI 218a by performing a drag gesture 261 also mimics a physical scenario of retrieving a physical file, hence making the task of attaching electronic files more intuitive for the user. Also, since the picker application 212 is automatically activated upon activating the text application 210, elements of the picker GUI 218 are pre-cached. This way, the user does not experience any substantial performance slow-downs upon expanding the picker GUI 218.

FIG. 10B is a screen shot of the text application GUI 216a of FIG. 11A having the picker GUI 218a in an expanded state. In this particular example embodiment, the picker GUI 218a partially overlays the text application GUI 216a. This provides a partial view of the text application GUI 216a so that the user may refer to the email text fields 254, 256 and 258 when selecting files to attach using the picker GUI 218a. The picker GUI 218a provides the user with a heatmap layout of a listing 264 of file suggestions (block 250). By way of background, a heatmap layout is an arrangement of icons wherein the size of each icon corresponds with a certain scalar attribute of the icon. For the picker GUI 218a, the size of each displayed file suggestions 264 corresponds to relevancy rating of the file, the relevancy rating of the file being determined by the method as described in FIG. 7. The displayed file suggestions 264 are arranged to minimize white space in the picker GUI 218a. The file suggestions are determined according to the method of FIG. 7.

The picker GUI 218a also provides a search box 270 that can be used to manually search the files database 228 for relevant files. In another example embodiment, the search box 270 instigates a search only within the listing 264 of file suggestions. This allows a user to search through numerous suggestions more quickly. For example, if box 271 is checked off by the user, then the further search is limited to the files in the listing 264.

The picker GUI 218a also includes an option to filter the listing 264 of file suggestions based on an attribute. The attribute can be, for example, file type, file date, or metadata. In this particular example embodiment, the picker GUI 218 provides virtual buttons 268 for filtering by documents, photos and contacts. The picker GUI 218a also provides an option for taking a photograph using the camera 123 of the mobile device 100c. A camera button 266 initiates a camera application (not shown). After a photograph is taken, the listing 264 of file suggestions is updated to include the file corresponding to photograph. In another example embodiment, the captured photograph is automatically attached to the message being composed.

The user can choose certain files from the listing 264 of file suggestions to be attached to the email (block 252) using a drag and drop gesture. Files dropped anywhere within the text application GUI 216a is recognized by the text application 210 as a file for attachment and then attached by the text application 210. Files that have been attached to the email are no longer displayed under the listing 264 of file suggestions. This reduces confusion for the user. In other words, since the file has already been attached and is no longer displayed in the listing 264, the user will not attempt to attached the same file again to the composed message.

In another example embodiment, the picker application 212 interacts with the text application 210 to rescale the text application GUI 216a such that both the picker GUI 218a the text application GUI 216a are fully in view without overlay.

For mobile devices 100c having a smaller screen, the listing 264 of file suggestions of FIG. 10B is displayed as a list instead of as a heatmap layout.

Turning now to FIG. 11A, a screen shot of an example text application GUI 216b for a text application 210 of the mobile devices 100a and 100b of FIGS. 2 and 3 is shown. In this particular example embodiment, the text application 210 is an email application. The features of the text application GUI 216b are substantially identical to the text application GUI 216a of FIG. 10. Upon activating the text application 210, the picker application 212 is automatically activated, with the picker GUI 218 defaulting to a minimized state. In this particular example embodiment, the picker button 278 is shown at the bottom of the screen. The picker GUI 218b is changed to a maximized state by performing a push gesture on the picker button 278. The maximizing of the picker GUI 218b also activates the keyword extraction engine 220 as before. In this particular example embodiment, the picker GUI 218b completely overlays the text application GUI 216b as shown in FIG. 11B. This configuration is, for example, desirable for mobile devices having a small screen where screen real estate is scarce.

The picker GUI 218b includes a listing 280 of suggested files as before (block 250). The files 280 are displayed as thumbnails in this example.

The picker GUI 218b also includes an option to filter the listing 280 of file suggestions as before, but via a drop-down menu 281 instead of via at least one button 268.

The picker GUI 218b also provides the user with the option of taking a photograph using a camera of the mobile device 100a and 100b, if a camera is available to use. A camera button 282 initiates a camera application. After the photograph is taken, the photograph is shown in the camera roll 284 portion of the picker GUI 218b.

Figure 12:
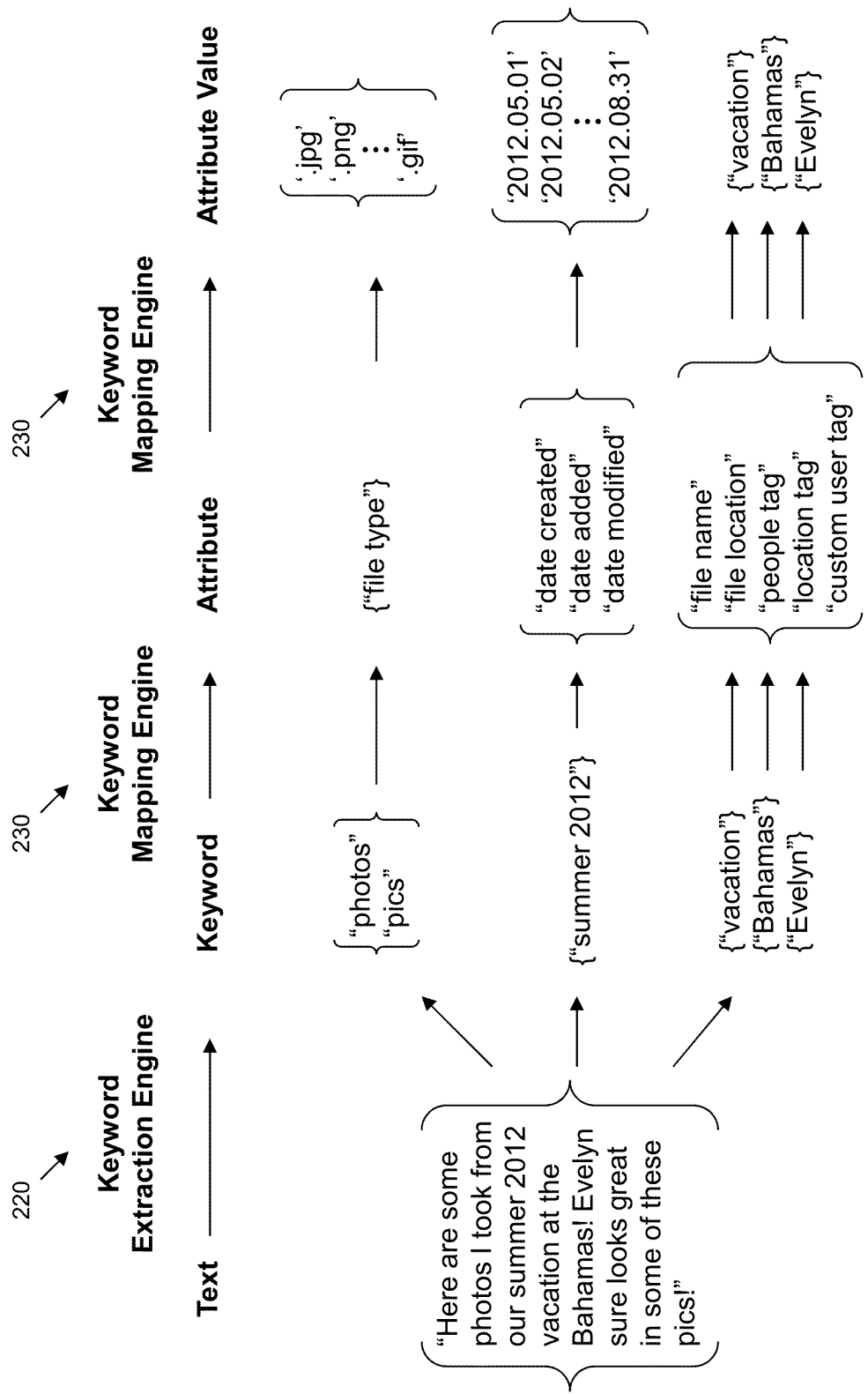
FIG. 12 is an illustration of an example embodiment of a mapping scheme in the context of vacation photos.
Figure 13:
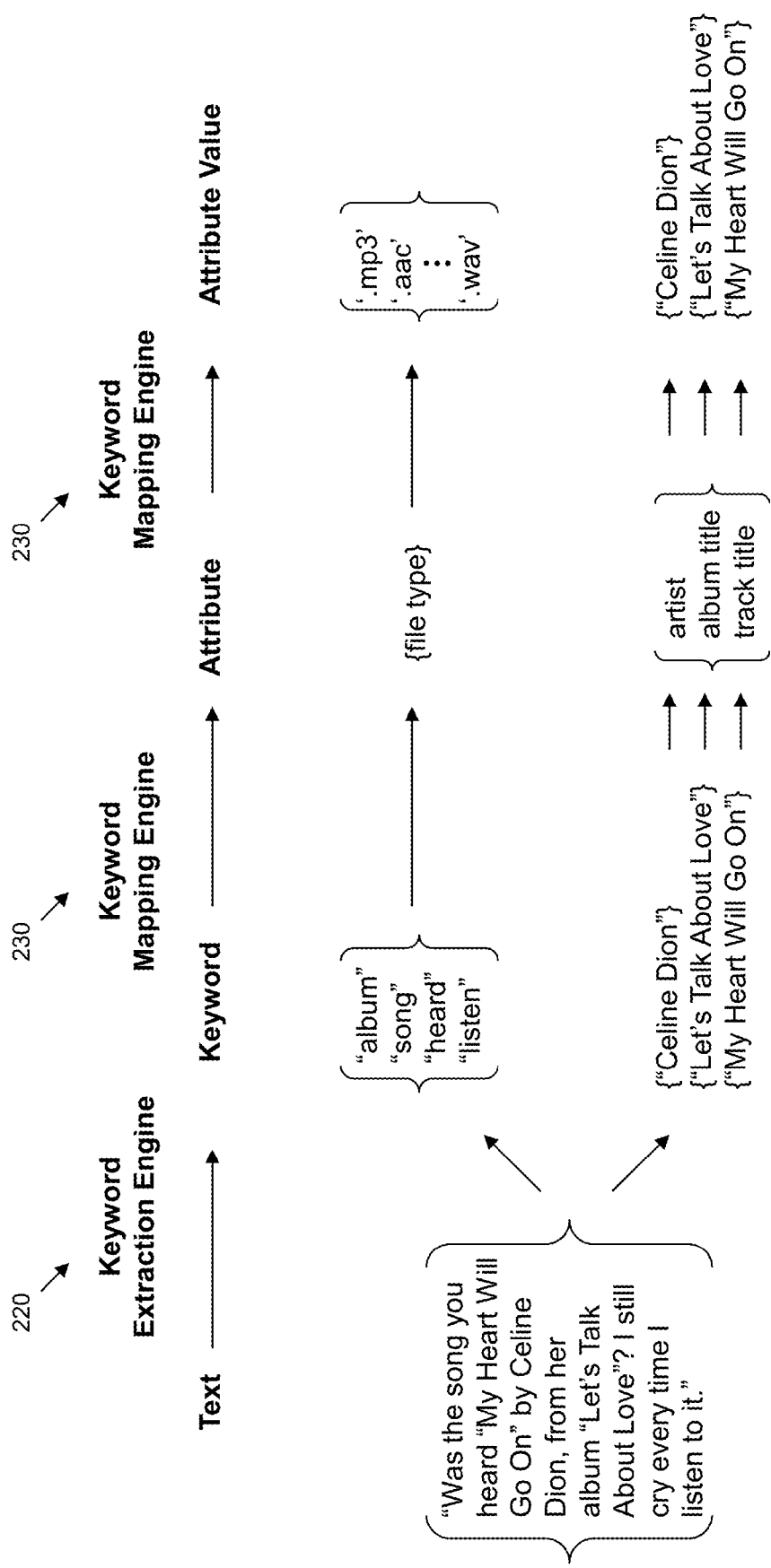
FIG. 13 is an illustration of an example embodiment of a mapping scheme in the context of a song recommendation.

To further illustrate the operation of the picker application 212, FIGS. 12 and 13 are provided which show example mappings from text to keywords (similar to the mapping of FIG. 8) and from keywords to attributes and attribute values (similar to the mapping of FIG. 9). In FIG. 12, the text is in the context of suggesting photo recommendations. In FIG. 13, the text is in the context of suggesting music.

FIGS. 7 through 13 provides an overview of the example functionality of the system and method for presenting relevant content when attaching files. Many variations and additional features can be introduced to the example method presented in FIG. 7 to further tailor the relevancy of the matched files.

Figure 14:
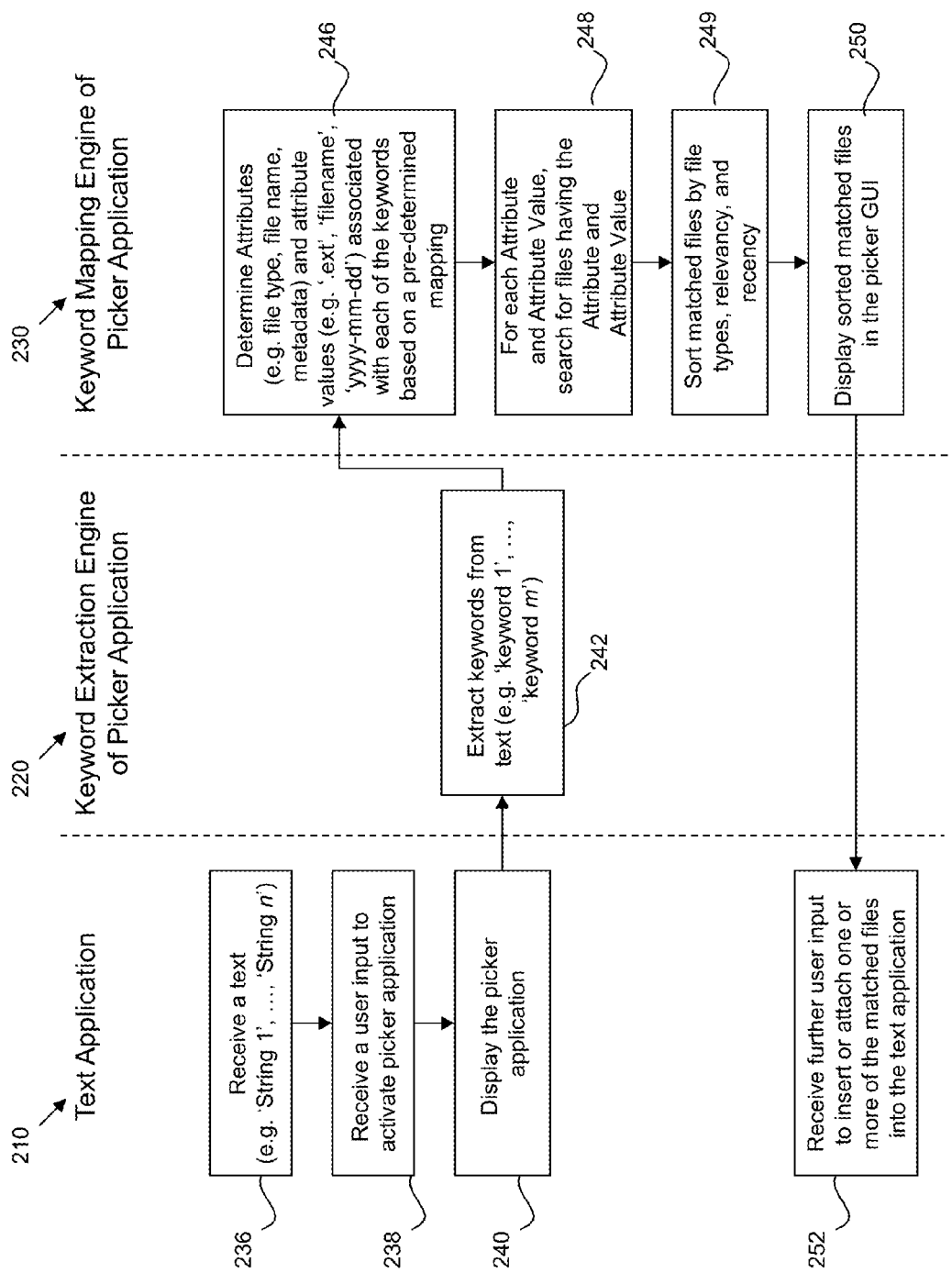
FIG. 14 is a flow diagram of an example embodiment of computer executable or processor implemented instructions for presenting relevant content when attaching files, wherein matched files are sorted by file types, relevancy, and recency.

Referring now to FIG. 14, a flow diagram of another example embodiment of a method for presenting relevant content when attaching files is presented. All blocks, besides block 249 of the method of FIG. 14, are identical to the blocks provided by the method in FIG. 7. In this example embodiment of a method, an additional block 249 sorts matched files by file types, relevancy, and recency, prior to displaying the matched files in the picker application per block 250. The sorting function can be carried out using methods well known in the art. For example, an algorithm may push the most recently edited files to the top of the listing 264 or 280 of matched files by comparing the "date modified" attribute of the matched files and sorting accordingly. For example, an algorithm may push the files having the highest relevancy rating to the top of the listing of matched files, the relevancy rating being determined by the method described in FIG. 7.

Figure 15:
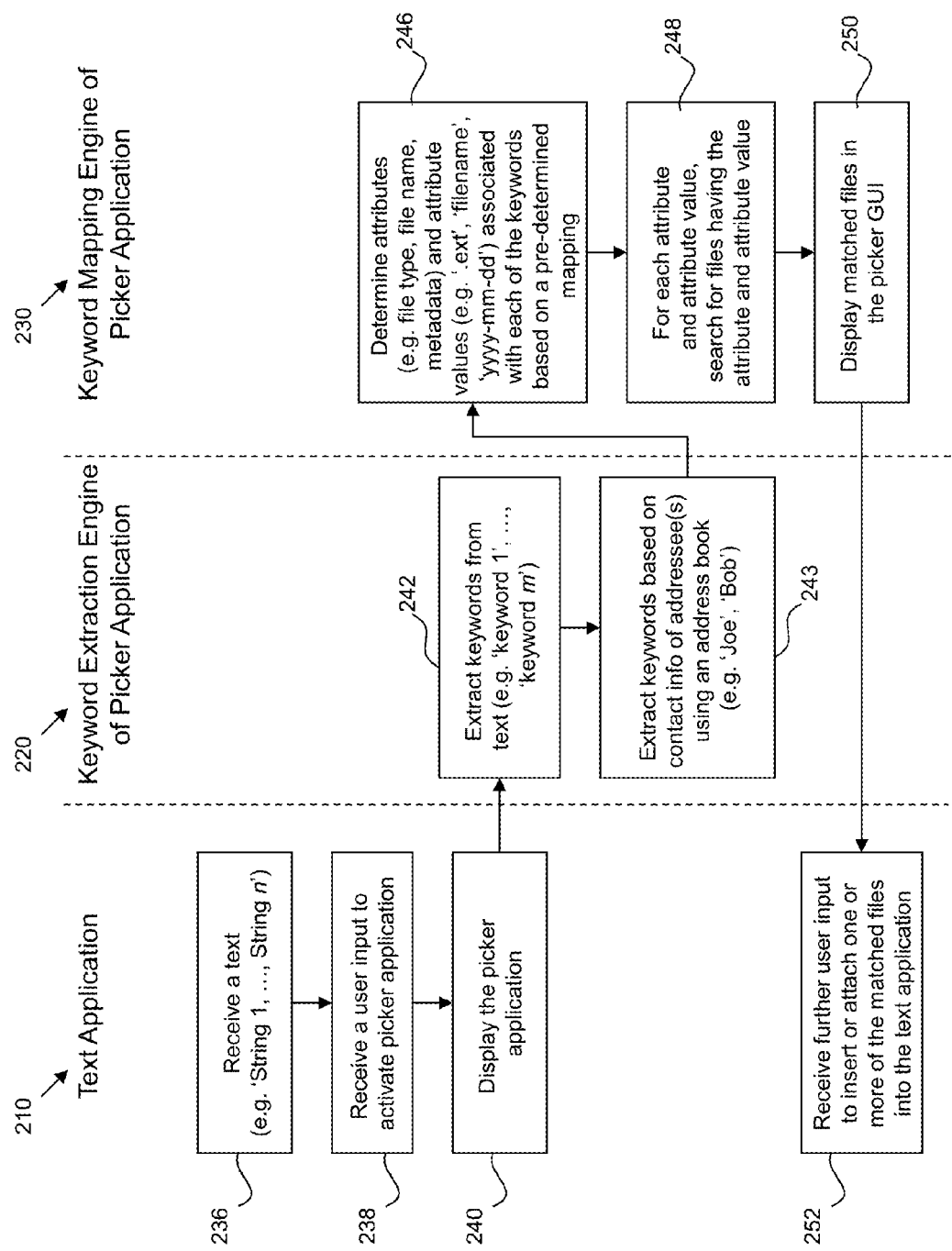
FIG. 15 is a flow diagram of an example embodiment of computer executable or processor implemented instructions for presenting relevant content when attaching files, wherein the method includes extracting keywords based on contact information of addressees using an address book.

Referring now to FIG. 15, a flow diagram of another example embodiment of a method for presenting relevant content when attaching files is presented. All blocks, besides block 243 of the method of FIG. 15, are identical to the blocks provided by the method in FIG. 7. In this example embodiment of a method, an additional block 243 extracts keywords based on contact information of at least one addressee. To perform this block, the keyword extraction engine 220 consults the address book database 224 to extract relevant contact information. The keyword extraction engine 220 uses keywords extracted in block 242 to assist in determining relevant contact information from the address book database 224. For example, if a text includes an email address, the keyword extraction engine 220 will use that email address to determine the corresponding contact in the address book database 224 from which to pull relevant contact information.

Figure 16:
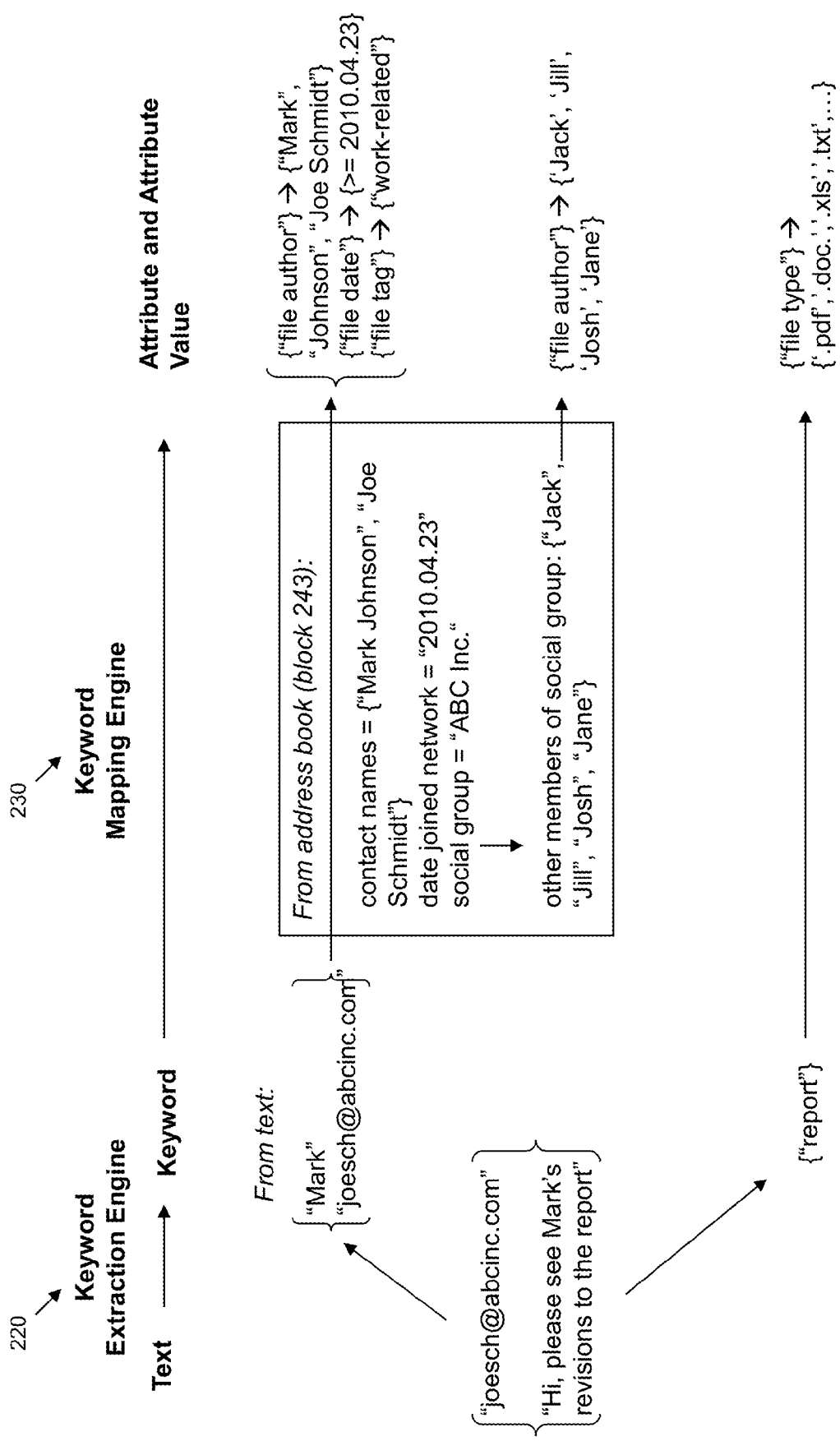
FIG. 16 is an illustration of an example embodiment of a mapping using the method provided in FIG. 15.

The usefulness of the method of FIG. 15 is best illustrated by way of example. Turning now to FIG. 16, an example embodiment of a mapping based on the method of FIG. 15 is provided. This example is in the context of an email application, wherein the user has entered "joesch@abcinc.com" in the "to" field 254, and "Hi, please see Mark's revisions to the paper" in the "body" field 258. The user has left the "subject" field 256 blank. The keyword extraction engine 220 extracts the keywords "Mark", "joesch@abcinc.com" and "report" using block 242. Names can be identified, for example, by words starting with a capital letter.

Next, the keyword extraction engine 220 consults the address book database 224 to determine relevant contact information based on the extracted keywords "Mark", "joesch@abcinc.com" and "report". In this example, the keyword extraction engine 220 did not retrieve any relevant contact information from the address book database 224 based on the keyword "report", so the keyword "report" was assigned a mapping based on a pre-determined mapping scheme. In another example, keywords such as "report" may have presented relevant contact information because "report" may have been found to match a custom label for some contact, e.g. if Mark's contact information was tagged with the word "report" under the custom fields of an address book. Based on the keywords "Mark" and "joesch@abcinc.com", the keyword extraction engine 220 has found two sets of contact information pertaining to a "Mark Johnson" and a "Joe Schmidt." The sets of contact information may include, for example, date of joining network and name of social group. The keyword extraction engine 220 can then proceed to extract keywords based on the two sets of contact information. These keywords are then mapped to attributes and attribute values based on a pre-determined mapping as in FIG. 9. For example, files authored by "Mark Johnson" or "Joe Schmidt" are selected for display on the picker GUI 218.

It is also possible to extract relationship information from the address book database 224. For example, the keyword extraction engine 220 can consult the address book database 224 to determine names of social groups to which Mark and Joe belong to. The information on social groups is an aspect that is recorded by the address book database 224. The keyword extraction engine 220 then discovers names of contacts within the identified social groups and uses this information to search for related files (e.g. by author). The keywords in this case then become the attribute value. In the example of FIG. 16, the keyword extraction engine 220 has discovered, by consulting the address book database 224, that Mark belongs to the social group "ABC Inc." The keyword extraction engine 220 then queries the address book database 224 for the names of other members of the social group "ABC Inc." From this query, the keyword extraction engine 220 discovers the names Jack, Jill, Josh and Jane, and assigns a keyword to each discovered name. The keyword mapping engine 230 then uses these new keywords and, based on a pre-determined mapping scheme of the keyword mapping database 226, maps these keywords directly to the attribute values of the "file author" attribute. Hence, matched files of block 248 will then include files relating to groups members of ABC Inc.

In another example embodiment, the text application 210 is a chat application, also commonly known as an instant messaging application. FIG. 17A is a screen shot of such a chat application for the mobile device 100c shown in FIG. 3. From herein, the chat application will be referred to as the text application 210, and the corresponding GUI will be referred to as the text application GUI 216.

The text application GUI 216c includes a reply field 286, a chat log 288, a contact name 290, and a listing of chat sessions 292. The chat log 288 provides a history of the most recent conversation activity for the currently highlighted chat session. The chat log 288 is synchronized with the chat log database 222 by the text application 210. The listing of chat sessions 292 provides a listing of past or currently active chat sessions that the user of the mobile device 100c has or is currently engaged in. The user can use the listing of chat sessions 292 in combination with the chat log 288 for each chat session to browse through the chat history of past or current engagements with other contacts.

The user can touch appropriate portions of the text application GUI 216c via the touch sensitive display 121 to interact with the elements of the text application GUI 216c. For example, the user can bring up a virtual keyboard (not shown) by touching the reply field 286. For example, the user can toggle between different chat sessions by touching the appropriate chat session listed in the listing of chat sessions 292. For example, the user can scroll through the chat history by performing a scrolling gesture on the area of the text application GUI 216c corresponding to the chat log 288.

A picker tab 260 of the picker application 210 is displayed on the right of the screen in FIG. 17A. Consistent with block 240 of FIG. 7, the user performs a drag gesture on the picker tab 260 to bring the picker GUI 218 into view as shown in FIG. 17B. Bringing the picker GUI 218 into view also simultaneously activates the keyword extraction engine 220 which will then begin to extract keywords based on the texts in the reply field 286, chat log 288 and contact name 290, based on the method as described in block 242 of FIG. 7. Note that in this particular example embodiment, the listing of chat sessions 292 is not consulted by the keyword extraction engine 220 in determining keywords. In another example as will be described later, the keyword extraction engine 220 does consult the listing of chat sessions 292 for determining keywords.

In the particular example embodiment of FIG. 17B, the picker GUI 218c partially overlays the text application GUI 216c. In this particular example embodiment, the text application GUI 216c also adapts to the presence of the picker GUI 218c by hiding the listing of chat sessions 292 portion of the text application GUI 218c (note the absence of the listing of chat sessions 292 from FIG. 17B). This provides the user with a partial view of the text application GUI 216c so that the user may refer to the reply field 286, contact name 290 and the chat log 288 while selecting matched files from the picker GUI 218c per block 252 of FIG. 7.

The features of the picker GUI 218c are substantially identical to the picker GUI 218a of FIG. 10B. An additional feature provided by the picker GUI 218c of FIG. 17B is a share location button 294 which provides the user's geographical location upon being activated by a suitable gesture. For example, the GPS coordinates of the mobile device 100c of the user may be broadcasted to the other participant of the currently highlighted chat session. The gesture may be a touch gesture, or the user may drag the share location button 294 onto anywhere within the text application GUI 216c.

Although the examples of FIGS. 17A and 17B describe a situation wherein chat sessions occurred between a user and one other user, it can be appreciated that all of the functionalities of the picker application 212 and picker GUI 218c are usable in a situation wherein the user is engaging in a group chat session with a plurality of other users. In this case, the contact name will instead comprise a plurality of contact names (not shown), and the keyword extraction engine 220 will extract keywords using the plurality of contact names in addition to the text from the reply field and the chat log.

It can be appreciated that although the text application GUI 216c and picker GUI 218c of FIGS. 17A and 17B are presented in the context of mobile device 100c, similar GUIs for a chat application can be contemplated for a user of mobile devices 100a and 100b.

It can be appreciated that although the picker tab 260 or picker button 278 of FIGS. 10A, 10B, 11A, 11B, 17A and 17B, are shown at specific locations on the screen, the picker tab 260 or picker button 278 can also be located at any other position on the screen without departing from the spirit of the invention. In other embodiments, the picker tab 260 or picker button 278 may not be an element on the screen, but be a physical switch on the mobile device 100. The switch can be in the form of a button, a knob, a slider, or any other form that accepts a physical user input. The switch would serve the same function as the picker tab 260 or picker button 278 of expanding the picker GUI 218 and of initiating the keyword extraction engine 220.

Various modifications to the method of FIG. 7 to enhance the relevancy of file suggestions, wherein the text application is a chat application, are also provided.

Figure 18:
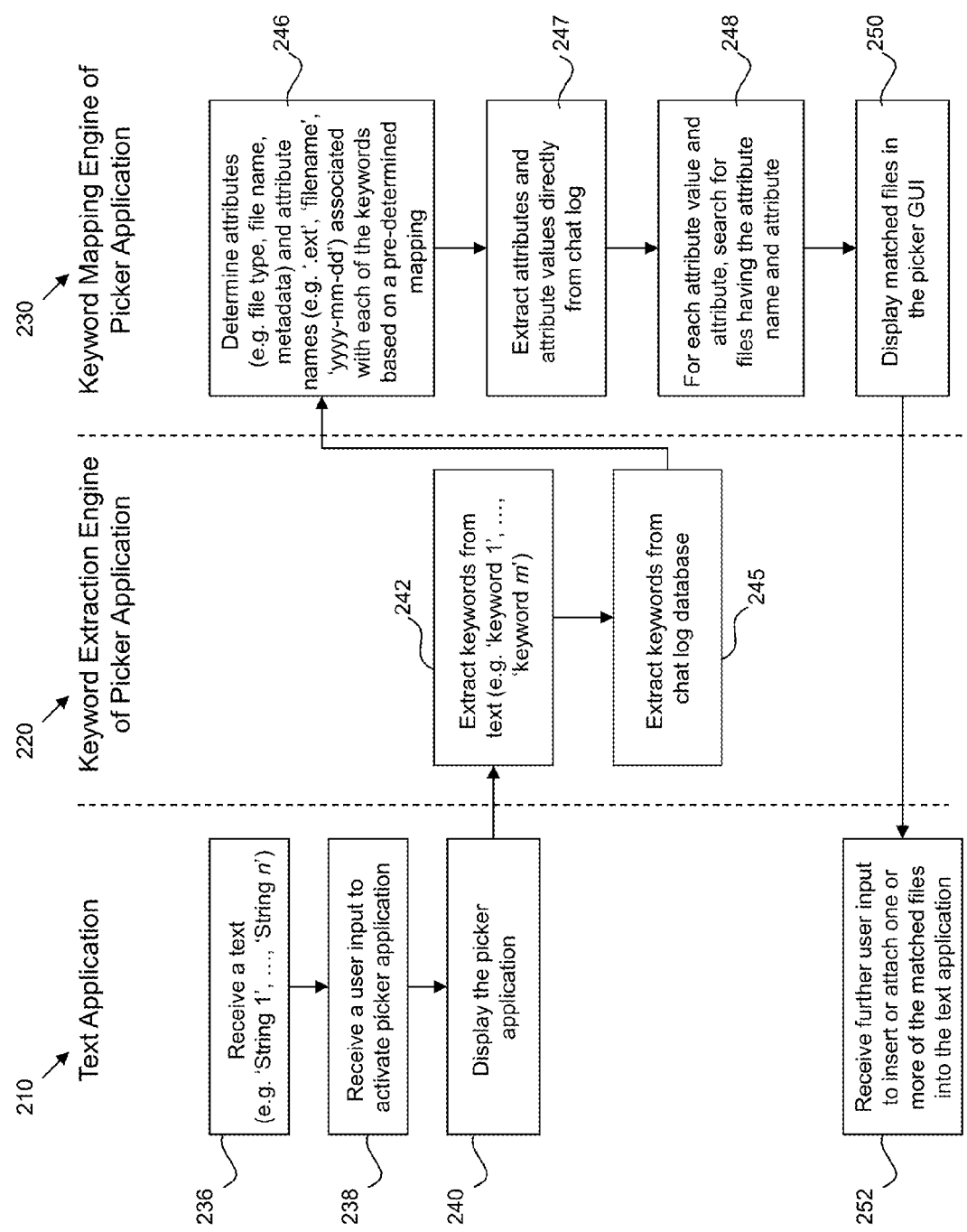
FIG. 18 is a flow diagram of an example embodiment of computer executable or processor implemented instructions for presenting relevant content when attaching files, including directly extracting attribute values and attributes based on chat history.

Referring now to FIG. 18, a flow diagram of another example embodiment method for presenting relevant content when attaching files, wherein the method includes extracting keywords based on chat history, is presented. This method is presented in the context of where the text application 210 is a chat application. In this example method, two additional blocks 245 and 247 are provided. All blocks aside from block 245 and 247 in the method of FIG. 18 are generally identical to the blocks provided by the method in FIG. 7. Note that the text received in block 236 comes from the reply field 286 of the chat application.

At block 245, the keyword extraction engine 220 consults the chat log database 222 to extract relevant keywords. The keyword extraction engine 220 uses keywords extracted in block 242, e.g. from the reply field 286, to assist in determining relevant keywords from the chat log database. For example, if a keyword determined in block 242 is "Justin", the keyword extraction engine will query the chat log database 222 for information pertaining to "Justin". It may be found that several chat sessions include a participant whose contact name 290, or otherwise another user identifier, is "Justin". The keyword extraction engine will then use text from these particular chat sessions to extract additional keywords.

At block 247, the keyword mapping engine 230 extracts attributes and attribute values directly from the chat log. The keyword mapping engine 230 queries the chat log database 222 for a record of the current chat session or related chat sessions as determined by block 245, and scans this record for direct references to file attributes and file types.

Figure 19:
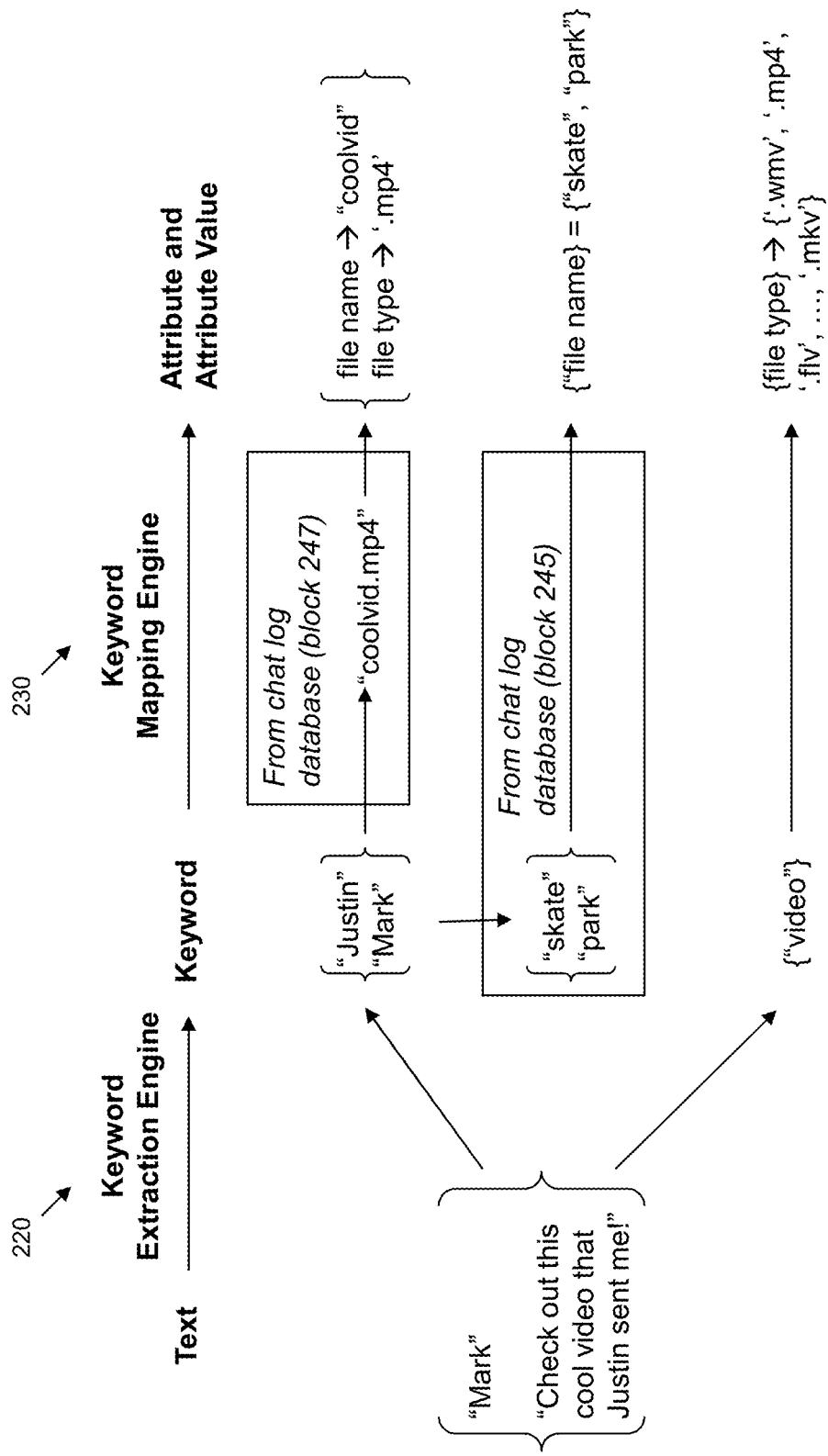
FIG. 19 is an illustration of an example embodiment of a mapping using the method provided in FIG. 18.

Turning now to FIG. 19, an example mapping using the method provided in FIG. 18 is shown. In this example, the user has entered the text "Check out this cool video that Justin sent me!" in the reply field 286. The text "Mark" has also been identified from the contact name 290. The keyword extraction engine 220 then extracts the words "Justin", "Mark", and "video" from the text (block 242 of FIG. 18). The keyword extraction engine 220 further consults the chat log database 222 as part of block 245 to extract additional keywords. In this example, the keyword extraction engine 220 has determined two records of chat sessions having the participant names "Justin" and "Mark". From the text within the two records of chat sessions, the keyword extraction engine 220 has additionally extracted two new keywords "skate" and "park." In another aspect, the keyword mapping engine 230 also consults the chat log database 222 to directly extract attributes and attribute values per block 247 of FIG. 18. The keyword mapping engine 230 uses the same two records of chat sessions previously discovered by the keyword extraction engine 220 to scan for direct references to filenames. In this example, the reference "coolvid.mp4" was mapped to a corresponding file name ("coolvid") and file type ("mp4").

The functionality of the picker settings application 234 will now be described. In the example embodiment, the picker settings application 234 performs two main functions. The first function is to allow the user to input custom mapping rules which are then recorded in the keyword mapping database 226. The second function is to allow users to input a toggle on or off of various features of the picker application 212.

Turning now to FIG. 20, a flow diagram illustrating the first function of the picker settings application 234 is provided.

At block 300, the picker settings application 234 receives a request an input from a user to add a new mapping rule to the keyword mapping database 226.

At block 302, the picker settings application 234 receives an input from the user at least one keyword.

At block 304, the picker settings application 234 receives an input from the user at least one attribute.

At block 306, the picker settings application 234 receives an input from the user at least one attribute value.

At block 308, for each combination of keyword, attribute, and attribute value, the picker settings application 234 defines a new mapping scheme.

At block 310, the picker settings application 234 adds the newly-defined mapping scheme to the keyword mapping database 226. The new mapping scheme is now available to be used by the keyword mapping engine 230, for example, per the method described in FIG. 7.

Turning now to FIG. 21, a flow diagram illustrating the second function of the picker settings application 234 is provided.

At block 301, the picker settings application 234 receives a request input from the user to add or modify at least one feature of the picker application 212.

At block 303, the picker settings application 234 reconfigures at least one feature of the picker application 212 corresponding to the request input from the user.

GUI aspects of the picker settings application 234 will now be described.

FIG. 22A through FIG. 22G are screen shots of an example picker setting application illustrating the various functionalities thereof.

Figures 22A, 22B:
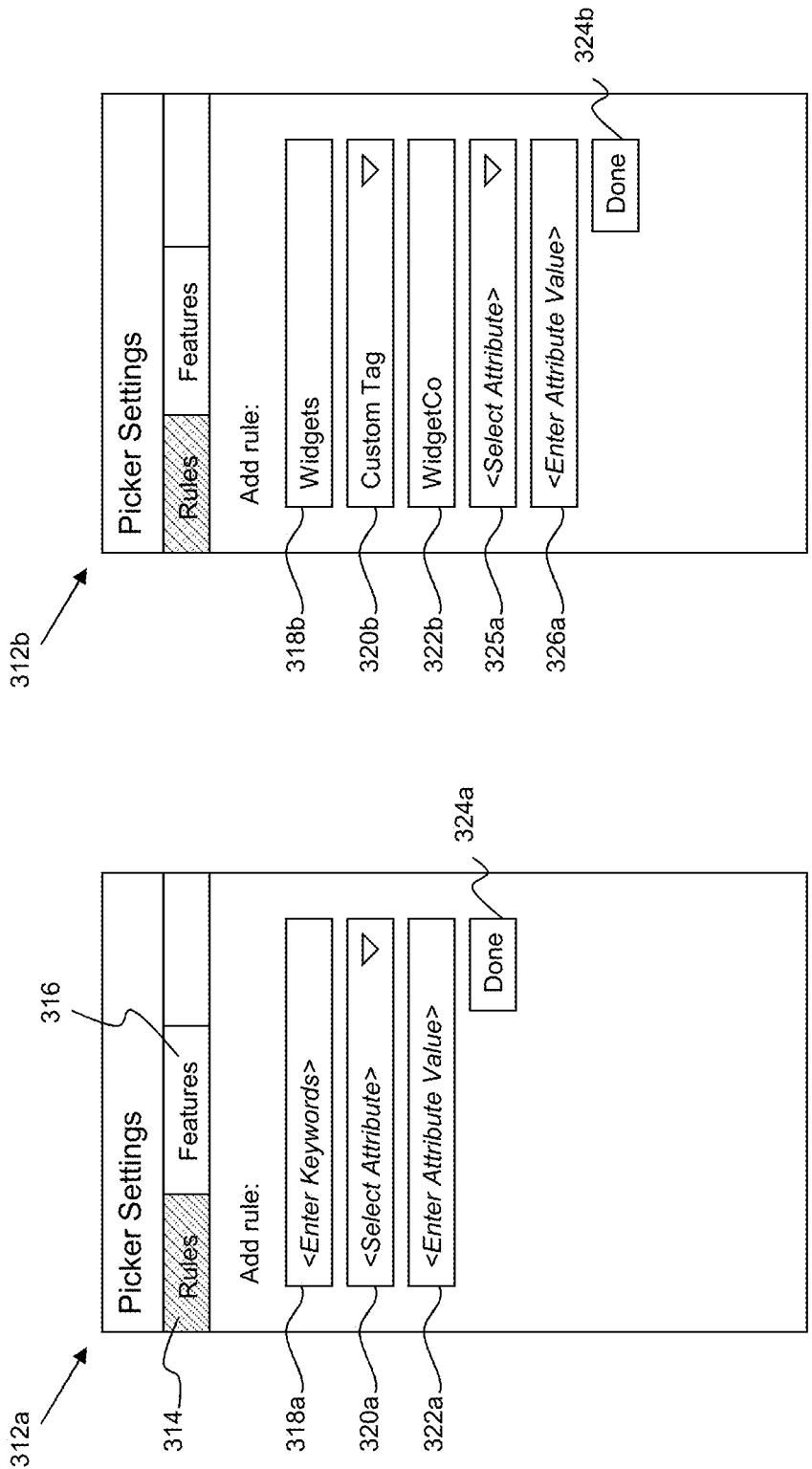

Turning now to FIG. 22A, a picker settings GUI 312 is shown. In this example embodiment, the picker settings GUI 312 is provided for the mobile devices 100a and 100b of FIG. 1 and FIG. 2. The picker settings GUI 312 includes a rules tab 312 and a features tab 316. When the rules tab 312 is selected, the picker settings GUI 312 further provides a keyword field 318a, an attribute field 320a, an attribute value field 322 and a done button 324. The keyword field 318a and the attribute value field 322 receives user input in the form of text. The attribute field 320a is provided as a drop-down menu for the convenience of the user. It can be appreciated that the attribute field 320a may also receive user input in the form of text.

In FIG. 22A, the user has not yet defined any custom rules, so there are no custom rules to display.

Turning now to FIG. 22B, the user has now provided text to the keyword field 318b ("Widgets") and attribute value field 322b ("WidgetCo"). The user has also selected an attribute 320b (Custom Tag) using the drop-down menu. An additional attribute field 325 and an additional attribute value field 326a have also appeared to provide the user with the option of adding a plurality of attributes. If the attribute field 210a had been in a format that received direct text input from the user instead of being a drop down menu, the additional fields 325a and 326a will not be necessary, as the user can enter a plurality of strings in each of the fields 318a, 320a and 322a which can be delimited, for example, by a space or a comma. In this example, the user chooses not to add any additional attributes so the user pushes the done button 324b.

It can be appreciated that a user can also use the settings GUI to specify a many-to-many relationship between keywords and attribute values. For example, a user can specify that any of the keywords "photo", "pic", "shot", "image", "picture", "see", "saw" are to trigger to searching of files having any of the file type values ".jpg", ".tiff", ".png", ".bmp", etc.

Figures 22C, 22D:
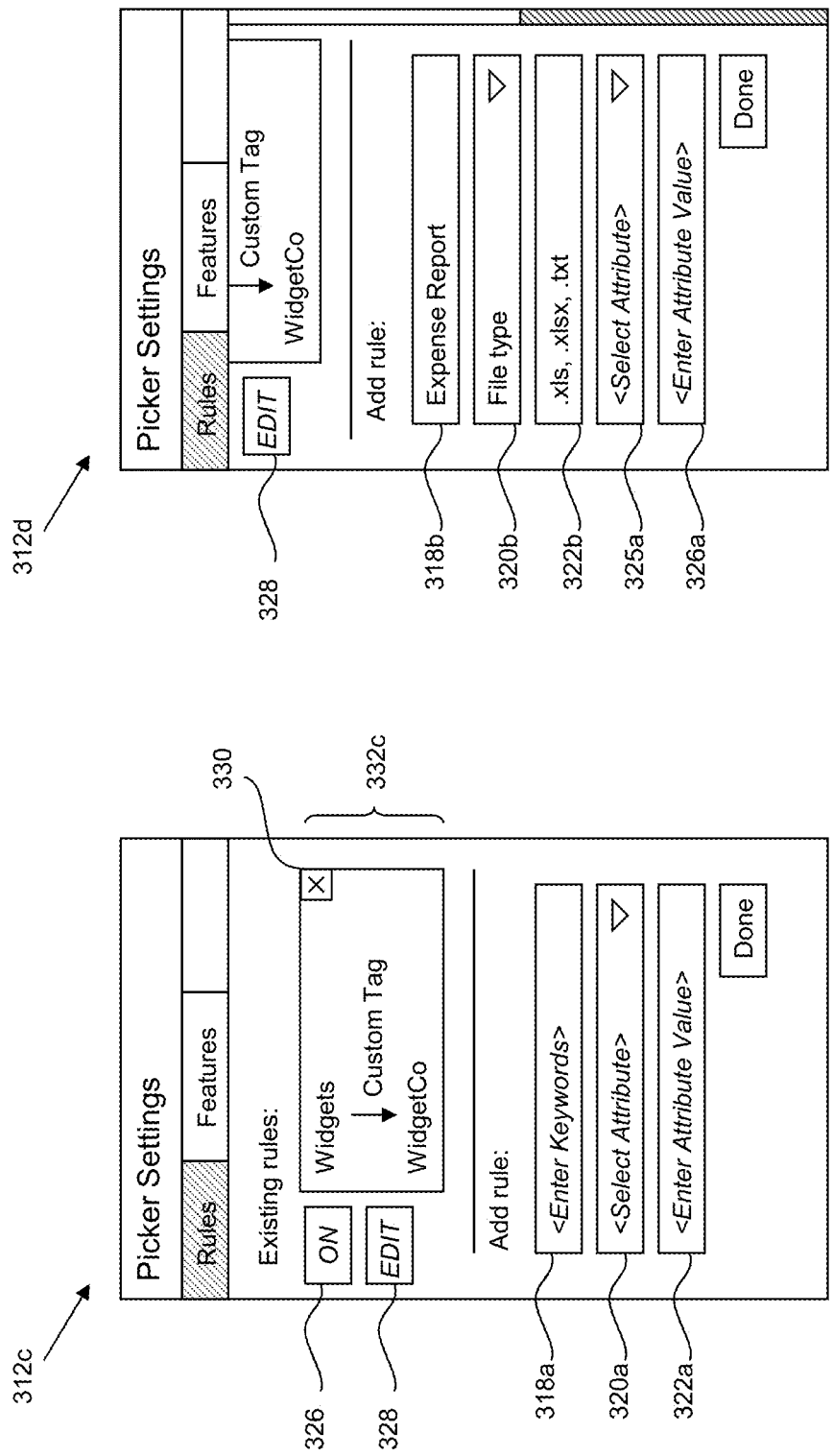

Turning now to FIG. 22C, the picker settings GUI 312c has generated a listing 332c of user-defined keyword mapping rules. The picker settings application 234 synchronizes the listing 332c of user-defined keyword mapping rules with the keyword mapping database 226. For each mapping rule of the listing 332c of user-defined keyword mapping rules, the picker settings GUI 312c also generates an on/off button 326, an edit button 328 and a delete button 330. The user may temporarily toggle the custom mapping off using the on/off button 326 so that the mapping is removed from the keyword mapping database 226, but retained as part of the picker settings GUI 312c. The user may also permanently delete the custom mapping using the delete button 330. In this case, the keyword mapping is removed from both the keyword mapping database 226 and from the picker settings GUI 312c. The user may make modifications to a custom mapping, for example, to change a keyword, by pressing the edit button 328. The picker settings GUI 312c has also generated a new keyword field 318a, attribute field 320a and attribute value field 322a to provide the user with the option of adding another set of keyword mappings.

Turning now to FIG. 22D, the user has defined a new keyword 318b ("Expense Report"), attribute 320b (file type), and a plurality of attribute values (".xls", ".xlsx", ".txt.") 322b. The picker settings GUI 312d has generated an additional attribute field 325a and an additional attribute value field 326a to provide the user with the option of adding a plurality of attributes.

Turning now to FIG. 22E, the user has decided to provide an additional attribute 423b (date modified) and an additional attribute value 324b (=Today). In the example embodiment, the picker settings application 234 recognizes the "=" operator as defining a logical function. The picker settings application 234 may be programmed to recognize strings which map to system attributes. For example, the string "today" may map to the date modified attribute as determined by the operating system of the mobile device 100. In the example embodiment, the picker settings GUI 312e may provide indication to the user if a logical function has been correctly registered. For example, if the user inputs "=today" for the attribute value 323b and the picker settings application 234 recognizes this function as being valid, the picker settings GUI 312e will display the attribute value 323b in a green color. For example, if the user inputs "=make sandwich" for the attribute value 323b, the picker settings application 234 does not recognize the logical function "make sandwich" so the picker settings GUI 312e will display the attribute value 323b in a red color. In another example embodiment, the picker settings GUI 312e may present the possible logical functions for assigning attribute values as a drop-down menu, thus alleviating the user with the task of identifying valid system attributes.

Continuing with FIG. 22E, the picker settings GUI 312e has generated an additional attribute field 334a and an additional attribute value field 336a to provide the user with the option of adding a plurality of attributes.

Referring now to FIG. 22F, the picker settings GUI 312f is shown wherein the user has pushed the done button 324e of FIG. 22E. The picker settings GUI 312f has generated a listing 332 of user-defined keyword mapping rules. The picker settings application 234 synchronizes the listing 332f of user-defined keyword mapping rules with the keyword mapping database 226. For each mapping rule of the listing 332f of user-defined keyword mapping rules, the picker settings GUI 312f also generates an on/off button 326, an edit button 328 and a delete button 330. The functionalities of the on/off button 326, the edit button 328 and the delete button 330 are the same as those described in FIG. 22C.

Figure 22G:
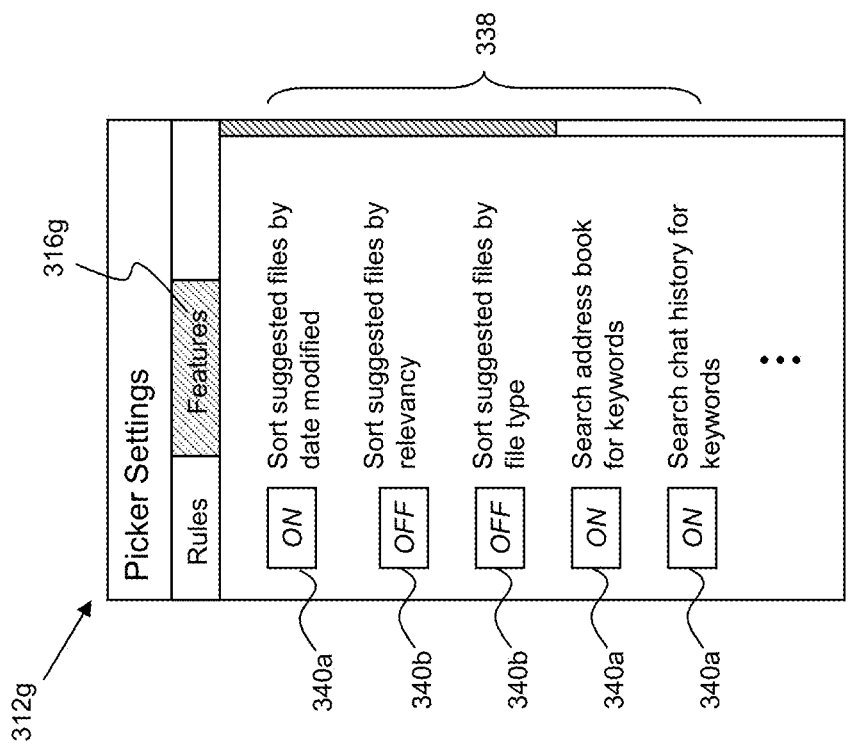

Referring now to FIG. 22G, the picker settings GUI 312g is shown having the features tab 316g selected. With the features tab 316g is selected, the picker settings GUI 312g further provides a listing 338 of customizable features of the picker application 212. An on/off button 340 is provided for each listing 338 of customizable features of the picker application 212. These customizable features may include sorting the file suggestions by date modified, relevancy, or file type, as in the method of FIG. 14, searching the address book for keywords as in the method of FIG. 15, or searching the chat history for keywords as in the method of FIG. 18. The user may enable or disable any of these customizable features to tailor the capabilities of the keyword extraction engine 220 or the keyword mapping engine 230 to suit the specific needs of the user. In this example, the user has disabled the features "sort suggested files by relevancy" and "sort suggested files by file type," and enabled all other features of the picker application 212. It can be appreciated additional customizable features of the picker application 212 will be added to the listing 338 of customizable features as they become available, for example, from software version updates.

In another example embodiment of the picker settings application 234, the picker settings GUI 312 allows the user to enter custom stop-words. The custom stop-words are then used by the keyword extraction engine 220 to further enhance the relevancy of the keywords in block 242.

It can be appreciated that the various aspects of the picker settings GUI 312 of FIG. 22 is easily transferable to the mobile device 100c or any other mobile or non-mobile device without departing from the spirit of the invention.

In an example embodiment, a method performed by a computing device for presenting relevant content is provided. It includes: providing a graphical user interface (GUI) for displaying text; providing a picker application, the picker application comprising a minimized GUI state and an expanded GUI state, the picker application initially in the minimized GUI state; changing the picker application from the minimized GUI state to the expanded GUI state; extracting at least one keyword from the text; using the at least one keyword to extract at least one attribute and at least one attribute value; using the at least one attribute and at least one attribute value to search for at least one file; and displaying, via the expanded GUI state of the picker application, a listing of the at least one file.

In another example embodiment aspect, the method further includes designating the at least one file to be an attachment to the text. In another example embodiment aspect, the method further includes, after detecting a drag gesture input, the picker application changing from the minimized GUI state to the expanded GUI state. In another example embodiment aspect, extracting one or more keywords is initiated by detecting the picker application has changed to the expanded GUI state. In another example embodiment aspect, the method further includes the at least one attribute is a file name, a file type, a date of file creation, a date of file modification, an author name, or a folder name, the at least one file being stored in a folder having the folder name. In another example embodiment aspect, an address book is used to identify and extract the at least one keyword. In another example embodiment aspect, the GUI for displaying text is a messaging application and a chat history log is used to identify and extract the at least one keyword. In another example embodiment aspect, the method further includes extracting the at least one attribute from a database of a listing of attributes according to at least one mapping rule between the at least one keyword and the at least one attribute. In another example embodiment aspect, the at least one mapping rule is defined by a user. In another example embodiment aspect, the method further includes extracting the at least one attribute value from a database comprising a listing of attribute values associated with the at least one attribute. In another example embodiment aspect, the method further includes using the at least one keyword to derive the at least one attribute value.

It will be appreciated that the particular example embodiments shown in the figures and described above are for illustrative purposes only and many other variations can be used according to the example embodiments described. Although the above has been described with reference to certain specific example embodiments, various modifications thereof will be apparent to those skilled in the art as outlined in the appended claims.

The invention claimed is:

1. A method performed by a computing device to present relevant content, comprising:
providing a graphical user interface (GUI) of a messaging application that displays text;
extracting a keyword from the text;
using the keyword to extract an attribute from a database comprising a listing of attributes according to a mapping rule between the keyword and the attribute, the attribute comprising a file type;
using the keyword or the attribute, to extract an attribute value specifying the file type;
using the attribute and the attribute value to search for at least one file;
displaying, via a picker application, a listing of the at least one file; and
attaching the at least one file to a message configured to be sent using the messaging application.

2. The method of claim 1, wherein the keyword is extracted from the text, after changing the picker application from a minimized GUI state to an expanded GUI state.

3. The method of claim 1, wherein the keyword is extracted from the text upon detecting that the picker application has changed from a minimized GUI state to an expanded GUI state.

4. The method of claim 2 further comprising, changing the picker application from the minimized GUI state to the expanded GUI state, after detecting a drag gesture input.

5. The method of claim 1, wherein multiple files are displayed in the picker application in order of relevancy.

6. The method of claim 1, wherein the attribute value is a file extension.

7. The method of claim 1, wherein an address book is used to identify and extract the keyword.

8. The method of claim 1, wherein a chat history log is used to identify and extract the keyword.

9. The method of claim 1, further comprising receiving the mapping rule at the computing device.

10. The method of claim 1, further comprising extracting the attribute value from a database including a listing of attribute values associated with the attribute.

11. A computing device to present relevant content comprising:
a display; and
a processor, interactive with the display, and configured to at least:
provide a graphical user interface (GUI) of a messaging application that displays text;
extract a keyword from the text;
use the keyword to extract an attribute from a database comprising a listing of attributes according to a mapping rule between the keyword and the attribute, the attribute comprising a file type;
use the keyword or the attribute, to extract an attribute value specifying the file type;
use the attribute and the attribute value to search for at least one file;
display, via a picker application, a listing of the at least one file; and
attach the at least one file to a message configured to be sent using the messaging application.

12. The computing device of claim 11, wherein the processor is further configured to extract the keyword from the text, after changing the picker application from a minimized GUI state to an expanded GUI state.

13. The computing device of claim 11, wherein the processor is further configured to extract the keyword from the text, upon detecting that the picker application has changed from a minimized GUI state to an expanded GUI state.

14. The computing device of claim 11, wherein the processor is further configured to change the picker application from the minimized GUI state to the expanded GUI state, after detecting a drag gesture input.

15. The computing device of claim 11, wherein multiple files are displayed in the picker application in order of relevancy.

16. The computing device of claim 11 wherein the attribute value is a file extension.

17. The computing device of claim 11 wherein the processor is further configured to use an address book to identify and extract the keyword.

18. The computing device of claim 11 wherein the processor is further configured to use a chat history log to identify and extract the keyword.

19. The computing device of claim 11, wherein the processor is further configured to receive the mapping rule.

20. The computing device of claim 11, wherein the processor is further configured to extract the attribute value from a database including a listing of attribute values associated with the attribute.

21. A method performed by a computing device to present relevant content, comprising:
displaying a settings graphical user interface (GUI);
receiving a request to add a mapping rule;
receiving a keyword, an attribute, and an attribute value, wherein the attribute comprises a file type and the attribute value specifies the file type;
generating the mapping rule, based on the keyword, the attribute, and the least one attribute value;
after detecting the keyword is displayed in text in a messaging application, using the mapping rule to search for at least one file having the attribute value;
displaying the at least one file in a picker application GUI; and
attaching the at least one file to a message configured to be sent using the messaging application.

22. The method of claim 21, wherein the attribute value is a file extension.

23. The method of claim 21, further comprising storing the mapping rule in a database.

24. The method of claim 21, wherein the keyword is detected in a chat history log.

25. A computing device to present relevant content, comprising:
a display;
a processor, interactive with the display, and configured to at least:
display a settings graphical user interface (GUI);
receive a request to add a mapping rule;
receive a keyword, an attribute, and an attribute value, wherein the attribute comprises a file type and the attribute value specifies the file type;
generate the mapping rule, based on the keyword, the attribute, and the least one attribute value;
after detecting the keyword is displayed in text in a messaging application, use the mapping rule to search for at least one file having the attribute value;
display the at least one file in a picker application GUI; and
attaching the at least one file to a message configured to be sent using the messaging application.

26. The computing device of claim 25, wherein the attribute value is a file extension.

27. The computing device of claim 25, wherein the processor is further configured to store the mapping rule in a database.

28. The computing device of claim 25, wherein the processor is further configured to detect the keyword in a chat history log.

* * * * *